(12) United States Patent
Erickson

(10) Patent No.: US 9,908,629 B2
(45) Date of Patent: *Mar. 6, 2018

(54) INFLATABLE PARACHUTE AIRBAG SYSTEM

(71) Applicant: Indemnis, Inc., Anchorage, AK (US)

(72) Inventor: Alan Jamal Erickson, Anchorage, AK (US)

(73) Assignee: Indemnis, Inc., Anchorage, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,604

(22) Filed: Feb. 17, 2017

(65) Prior Publication Data

US 2017/0158337 A1 Jun. 8, 2017

Related U.S. Application Data

(63) Continuation of application No. 14/850,642, filed on Sep. 10, 2015, now Pat. No. 9,611,045.

(Continued)

(51) Int. Cl.
  *B64D 17/00* (2006.01)
  *B64D 17/72* (2006.01)
  (Continued)

(52) U.S. Cl.
  CPC ............ *B64D 17/72* (2013.01); *B64C 39/024* (2013.01); *B64D 17/80* (2013.01); *B64C 2201/027* (2013.01); *B64C 2201/185* (2013.01)

(58) Field of Classification Search
  CPC ........ B64D 25/12; B64D 25/14; B64D 17/80; B64D 17/72; B64D 19/02; B64C 3/62;
  (Continued)

(56) References Cited

U.S. PATENT DOCUMENTS 269,317 A * 12/1882 Peace ..................... A45B 19/02
                                                    135/20.2
1,019,271 A *  3/1912 Nelson ................... A64D 17/72
                                                    244/139

(Continued)

FOREIGN PATENT DOCUMENTS

FR           454100 A  *  6/1913  ............. B64D 17/72
FR          1094964 A  *  5/1955  ............. B64D 17/72
WO    2014/080409 A1     5/2014

OTHER PUBLICATIONS

Holloway, "Dramatic "Safety Sphere" concept provides all-round protection for motorcyclists," Gizmag, Feb. 6, 2012, accessed Oct. 28, 2015, from http://www.gizmag.com/safety-sphere-motorcycle-airbag/21354/, 9 pages.

(Continued)

*Primary Examiner* — Assres H Woldemaryam
(74) *Attorney, Agent, or Firm* — Seed IP Law Group LLP

(57) ABSTRACT

A system and method that reduces the descent velocity of an aerial vehicle, the system including a control system, an inflation device, and a deployable, inflatable cage. The control system detects a descent condition, such as an uncontrolled descent and activates the inflation device to inflate the cage to at least partially encase the aerial vehicle and protect the vehicle during descent and landing. The inflatable cage includes a main fill tube, a perimeter tube, and support tubes. The support tubes are connected between the main fill tube and the perimeter tube, and enable gas to flow from the inflation device through the support and perimeter tubes and into the perimeter tube. A drag inducing material enclosure is connected to the inflatable cage and structured to induce drag to reduce a descent speed of the aerial vehicle.

20 Claims, 28 Drawing Sheets

Related U.S. Application Data

(60) Provisional application No. 62/181,855, filed on Jun. 19, 2015.

(51) Int. Cl.
    *B64D 17/80* (2006.01)
    *B64C 39/02* (2006.01)

(58) Field of Classification Search
    CPC ....... B64C 27/08; B64C 25/36; B64C 39/024; B64C 2201/027; B64C 2201/042; A63H 33/005; A63H 27/12
    USPC .................. 244/146, 147, 152, 139; 182/48; 135/20.2
    See application file for complete search history.

(56) References Cited

U.S. PATENT DOCUMENTS

| | | | |
|---|---|---|---|
| 1,342,221 A | 6/1920 | McDonald | |
| 1,855,320 A * | 4/1932 | Schwabek | B64D 17/72 244/142 |
| 1,901,173 A * | 3/1933 | Kuhn | B64B 1/100 244/5 |
| 2,993,667 A * | 7/1961 | Cushman | B64D 17/52 244/142 |
| 3,622,108 A | 11/1971 | Mathewson | |
| 3,675,259 A * | 7/1972 | Gilchrist | B63B 1/047 440/100 |
| 3,761,979 A | 10/1973 | Daughenbaugh | |
| 4,005,655 A | 2/1977 | Kleinschmidt et al. | |
| 4,050,657 A | 9/1977 | Murphy | |
| 4,105,173 A * | 8/1978 | Bucker | A62B 1/22 182/3 |
| 4,205,811 A | 6/1980 | Palm et al. | |
| 4,215,836 A | 8/1980 | Zacharin | |
| 4,370,994 A * | 2/1983 | Pittman | A45B 19/02 135/20.2 |
| 4,643,210 A * | 2/1987 | Feld | A45B 19/02 135/20.2 |
| 4,648,568 A * | 3/1987 | Phillips | B64C 27/006 244/17.13 |
| 4,793,575 A | 12/1988 | Butler | |
| 4,978,110 A | 12/1990 | Lin et al. | |
| 5,005,785 A * | 4/1991 | Puskas | B64D 17/025 244/152 |
| 5,103,848 A * | 4/1992 | Parsons | A45B 19/02 135/20.2 |
| 5,755,405 A * | 5/1998 | Socha | B64D 17/02 244/142 |
| 5,765,778 A | 6/1998 | Otsuka | |
| 5,836,544 A | 11/1998 | Gentile | |
| D433,726 S * | 11/2000 | Peterson | D21/801 |
| 6,318,390 B1 * | 11/2001 | Innis | A45B 19/02 135/20.2 |
| 6,503,119 B1 * | 1/2003 | Lapointe | A63H 33/20 244/138 R |
| 6,565,041 B1 | 5/2003 | Young et al. | |
| 6,682,017 B1 | 1/2004 | Giannakopoulos | |
| 7,874,513 B1 | 1/2011 | Smith | |
| 8,016,239 B2 | 9/2011 | Hakki et al. | |
| 8,123,162 B2 | 2/2012 | Sirkis | |
| 8,186,625 B2 | 5/2012 | De Jong | |
| 8,191,831 B2 | 6/2012 | Nadir | |
| 8,375,837 B2 | 2/2013 | Goossen et al. | |
| D697,145 S * | 1/2014 | Wong | D21/436 |
| 2002/0070315 A1 | 6/2002 | Hilliard et al. | |
| 2003/0094544 A1 | 5/2003 | Yamada | |
| 2003/0234320 A1 * | 12/2003 | Colting | B64B 1/02 244/96 |
| 2004/0045593 A1 * | 3/2004 | Chang | A45B 19/02 135/20.2 |
| 2005/0087653 A1 | 4/2005 | Koch | |
| 2007/0152102 A1 * | 7/2007 | Gargano | B64D 17/18 244/145 |
| 2012/0018579 A1 * | 1/2012 | Yan | A63H 27/12 244/119 |
| 2014/0131507 A1 * | 5/2014 | Kalantari | A63H 27/12 244/2 |
| 2016/0332739 A1 * | 11/2016 | Wong | B64C 39/00 |

OTHER PUBLICATIONS

Screenshot from *Die Another Day*, Metro-Goldwyn-Mayer, released Nov. 20, 2002, taken from https://www.youtube.com/watch?v=KKqdgvsbfFQ, Oct. 28, 2015, 1 page.

Tomich, J., "ComEd gets OK to deploy drones for power system inspections," Energywire, Apr. 14, 2015, retrieved Jan. 28, 2016 from http://www.eenews.net/stories/1060016677; 3 pgs.

* cited by examiner

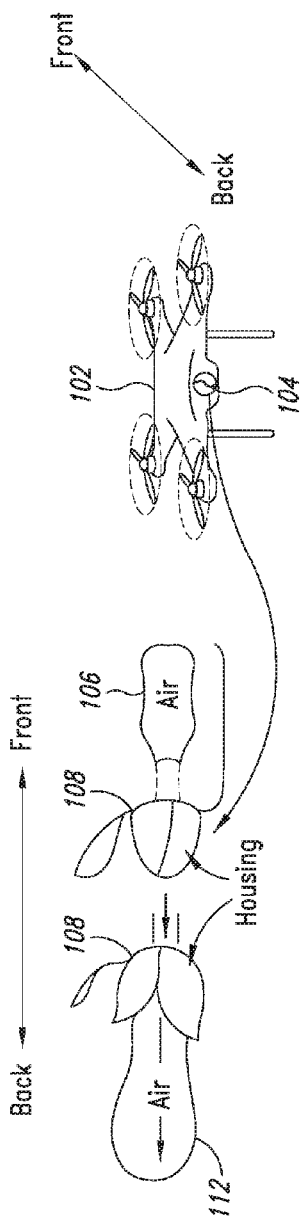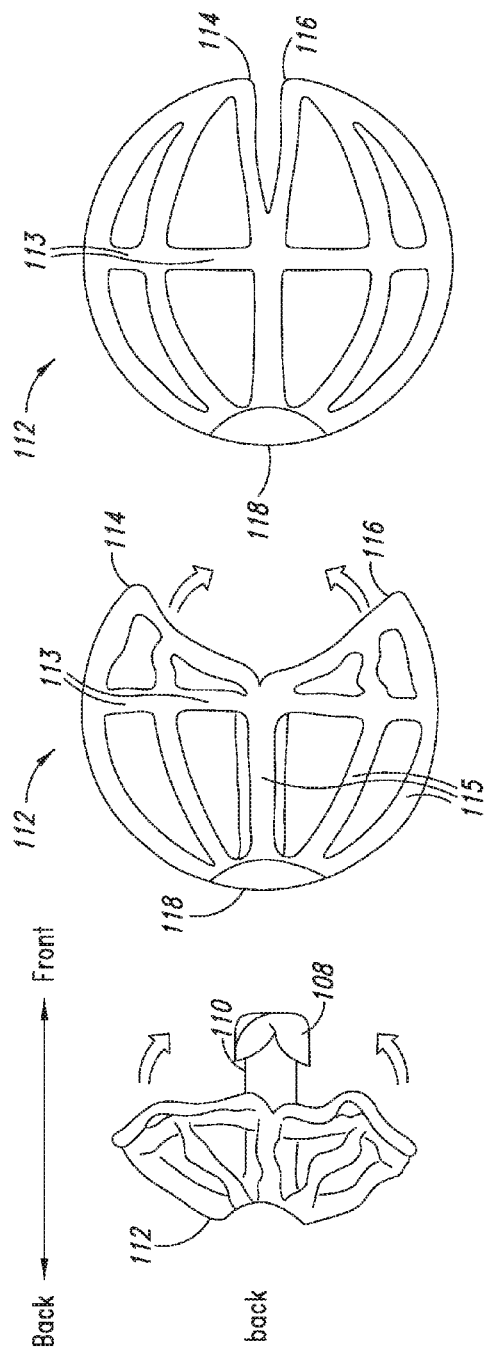
FIG. 1A
FIG. 1B
FIG. 1C
FIG. 1D

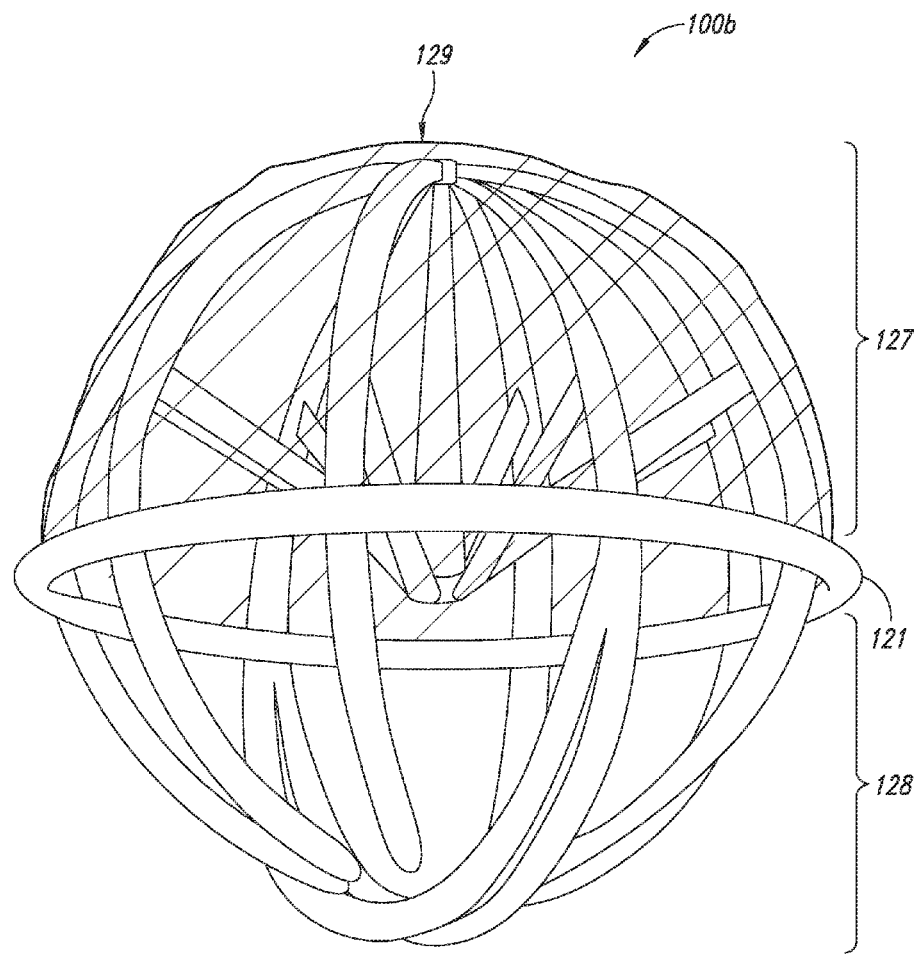
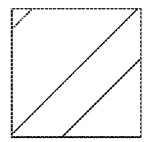 Parachute Material (129)
FIG. 3B

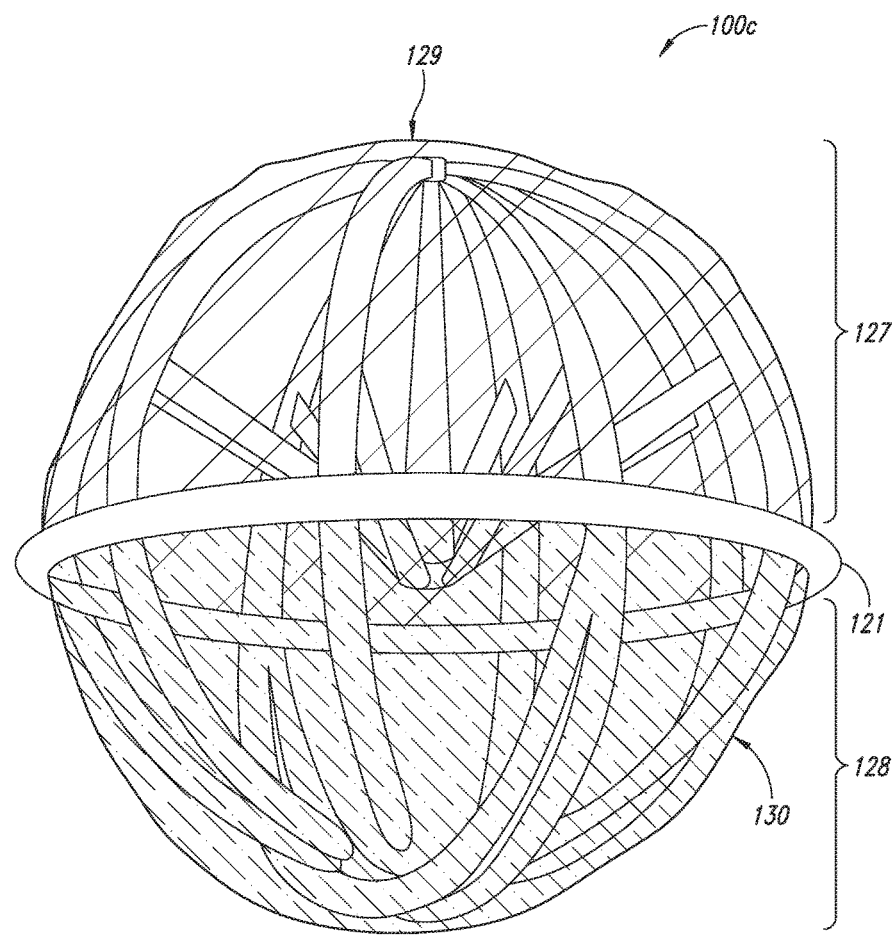
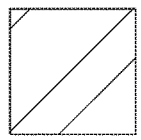 Parachute Material (129)
 Mesh Material (130)
FIG. 3C

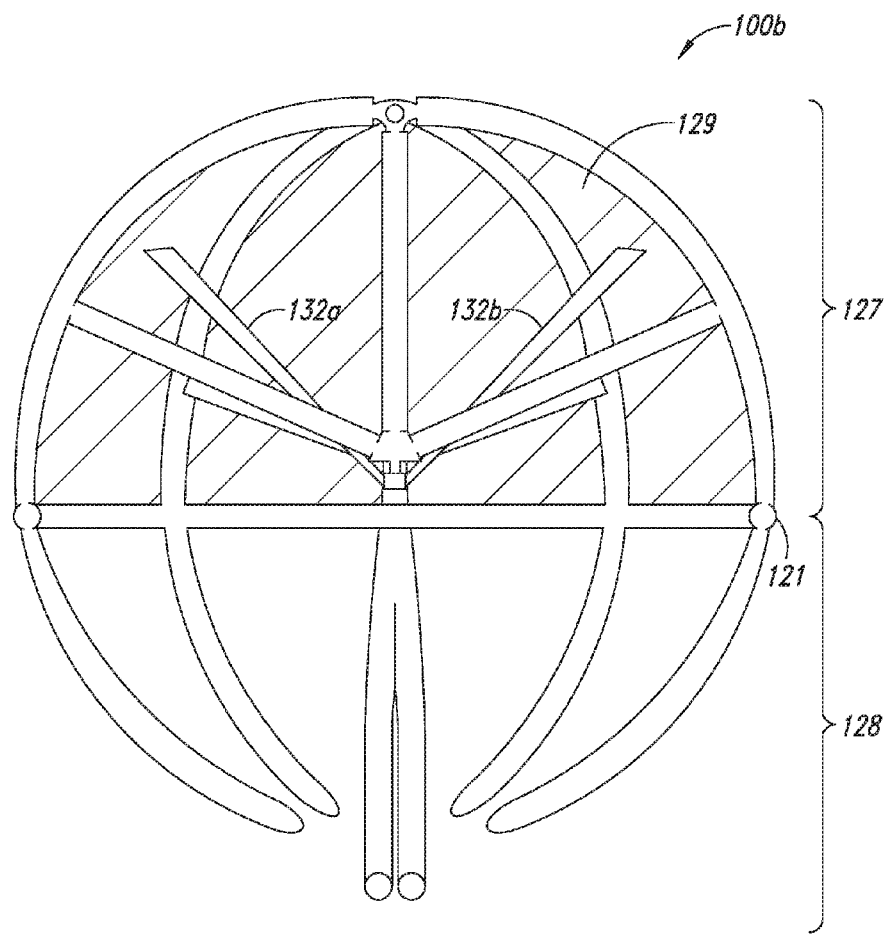
FIG. 8B
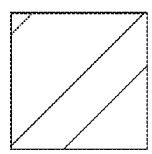 Parachute Material (129)

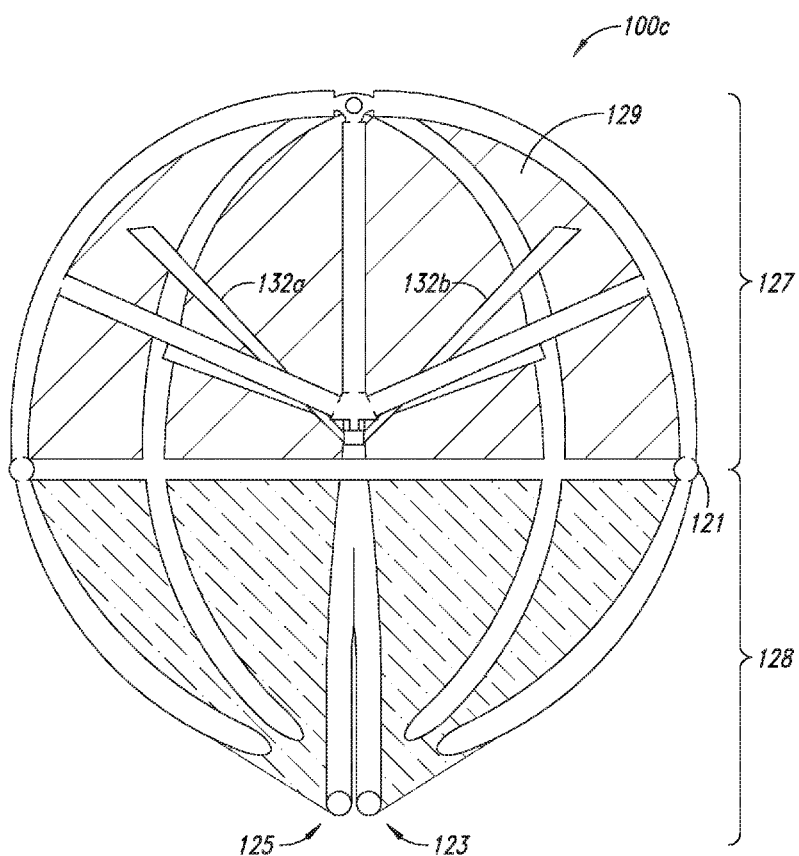
FIG. 8C
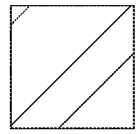 Parachute Material (129)
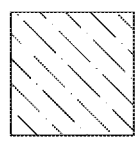 Mesh Material (130)

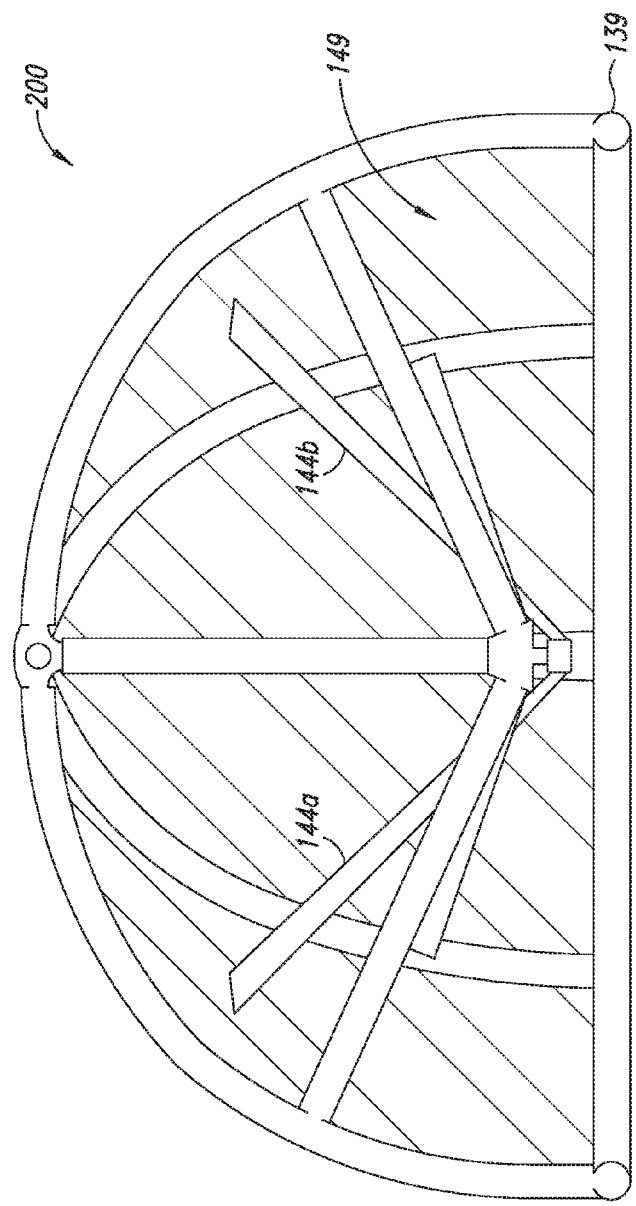
FIG. 14B
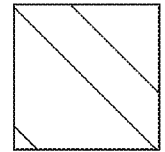
Parachute Material (149)

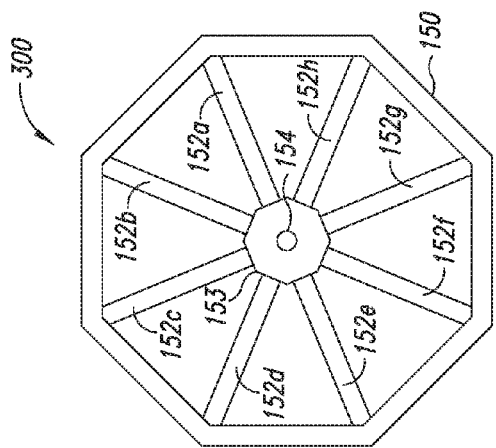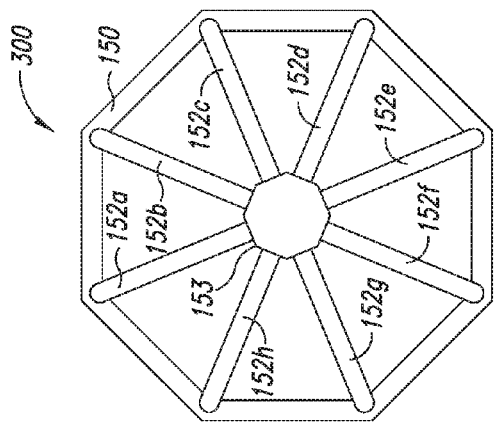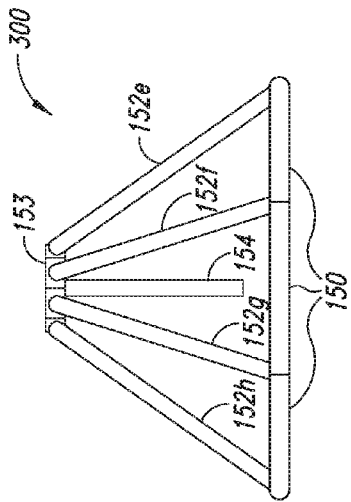

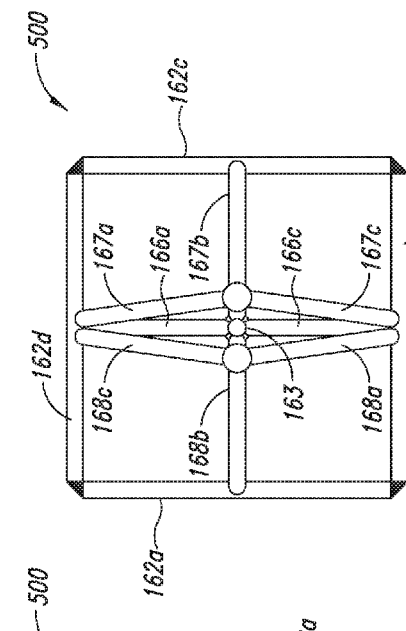
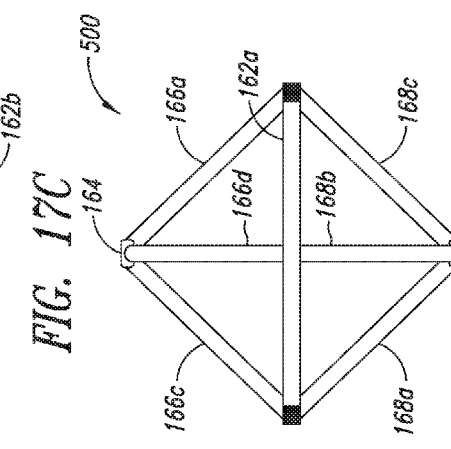
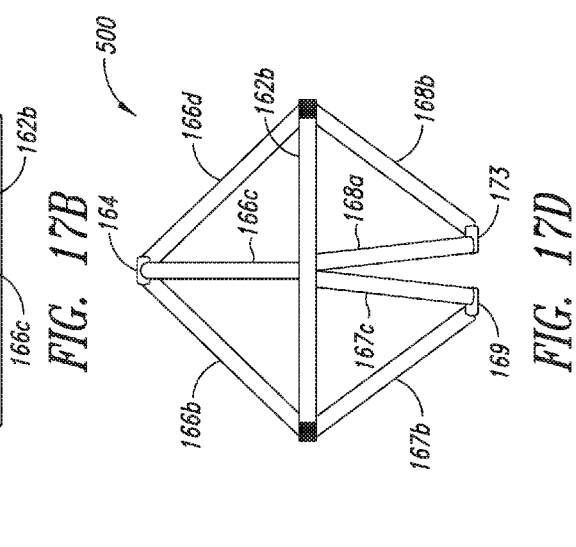
FIG. 17B
FIG. 17C
FIG. 17D
FIG. 17E

INFLATABLE PARACHUTE AIRBAG SYSTEM

BACKGROUND

Technical Field

The present disclosure pertains to airborne object protection and, more particularly, to providing a system having a deployable assembly that attaches to the airborne object and when deployed provides parachute- and airbag-like properties to safely return the airborne object to the ground.

Description of the Related Art

Recent advancements in drone and personal-unmanned aerial vehicle technology have greatly reduced the cost of these vehicles and made them readily available to the general public. Although these vehicles are more affordable than in previous years, their cost is still significant enough to warrant some protection against damage resulting from an in-air failure.

When an inflight failure occurs, aerial vehicles generally begin to plummet towards the ground. Inflight failures generally cannot be corrected before the vehicle hits the ground due to low flying altitudes or non-recoverable failures (e.g., a dead battery). Such crashes often leave the vehicle with major, or even irreparable, damage.

Some aerial vehicles utilize traditional parachute systems to slow a descent of the vehicle. These parachute systems, however, generally work so long as the aerial vehicle is upright during the entire deployment phase of the parachute. Unfortunately, many failures result in sporadic and uncontrollable movement of the vehicle such that parachutes cannot be properly deployed, often resulting in the aerial vehicle crashing despite an attempt to deploy a traditional parachute system. It is with respect to these and other considerations that implementations of the present disclosure have been made.

BRIEF SUMMARY

The present disclosure is directed to a system and method for resisting an uncontrolled descent of an aerial vehicle.

In accordance with one aspect of the disclosure, the system includes an inflatable cage that is structured to be attached to and stored on the aerial vehicle and deployed from the aerial vehicle if the aerial vehicle enters an uncontrolled descent or loss of control state. The inflatable cage includes a hub, a plurality of support tubes, and a perimeter tube. Each of the support tubes is connected to the hub and the perimeter tube in a concave-like structure. One or more fill tubes are in fluid communication with the support tubes to enable inflation of the support tubes. An inflation mechanism is operable to inflate the inflatable cage in response to detection of an uncontrolled condition, such as an uncontrolled descent or loss of control of the aerial vehicle.

In accordance with one aspect of the present disclosure, a second plurality of support tubes is connected to the perimeter tube opposite of the plurality of support tubes. These additional support tubes are structured to mobilize around the aerial vehicle while the inflatable cage is being deployed and to encase the aerial vehicle within the inflatable cage.

The system also includes an enclosure that is connected to the inflatable cage. The enclosure may be parachute material that is structured to create drag to reduce a velocity or descent speed of the aerial vehicle when the inflatable cage and the enclosure are deployed together. The system also includes a plurality of weight distribution straps that are physically coupled between the aerial vehicle and the enclosure or the support tubes of the inflatable cage. In some implementations, the weight distribution straps are removably attached to a main fill tube such that the weight distribution straps separate from the main fill tube as the inflatable cage is deployed.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIGS. 1A-1D illustrate the stages of deployment of an inflatable parachute airbag system in accordance with the present disclosure;

FIGS. 3A-3C are bottom left perspective views of an inflatable parachute airbag assembly in accordance with the present disclosure;

FIGS. 8B-8C are front cross-section views of the inflatable parachute airbag assemblies shown in FIGS. 3B and FIGS. 3C, respectively;

FIGS. 14A-14B are front cross-section views of the inflatable parachute airbag assembly shown in FIG. 9;

FIGS. 15A-15C are various views of an alternative inflatable parachute airbag assembly in accordance with the present disclosure;

FIGS. 17A-17E are various views of an alternative inflatable parachute airbag assembly in accordance with the present disclosure;

DETAILED DESCRIPTION

Figure 2B:
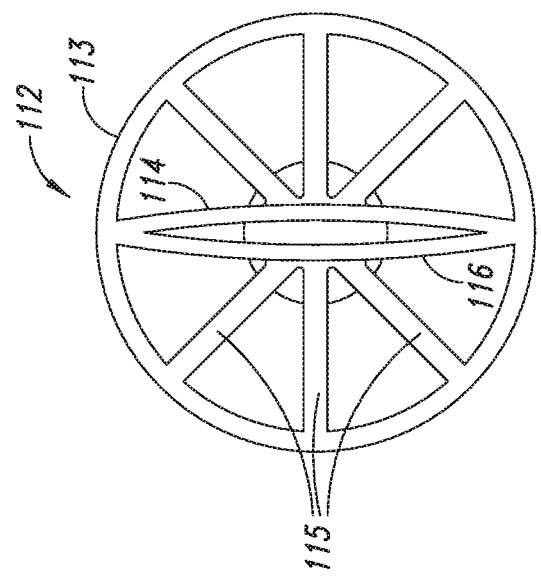
FIGS. 2A-2B illustrate top and bottom views of an inflatable parachute airbag assembly in accordance with the present disclosure.

In the following description, certain specific details are set forth in order to provide a thorough understanding of various disclosed implementations. However, one skilled in the relevant art will recognize that the present disclosed implementations may be practiced without one or more of these specific details or with other methods, components, materials, etc. In other instances, well-known structures or components or both that are associated with the environment of the present disclosure have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation.

As used herein, the term "aerial vehicle" refers to a powered airborne object controlled by a user or autonomously, such as through an automated position-control system. Examples of aerial vehicles can include, but are not limited to, unmanned aerial vehicles, drones, manned aerial vehicles, or the like.

Reference throughout this description to a "tube" means a lightweight, flexible, hollow body that can be inflated with a gas or other fluid to create a semi-rigid structure. Tubes can be linear, arcuate, circular, oval, or a variety of other shapes that perform similar functions to those that are described and illustrated herein. As described throughout, a tube may be a "fill tube," a "support tube," a "perimeter tube," or other similar tubes. In general, fill tubes are connected to and in fluid communication with support tubes to provide fluid from an inflation mechanism to the support tubes and to the perimeter tube. In some implementations, fill tubes may connect to and be in fluid communication with the perimeter tube independent of the support tubes. As described herein, the support tubes (and the fill tubes in some implementations) in conjunction with the perimeter tube create a three-dimensional semi-solid structure of pressurized tube when deployed. The structure includes a concave-like portion such that when parachute material is attached to the concave-like portion and the system is deployed from an aerial vehicle, drag is created on the parachute material causing a velocity of the aerial vehicle to be reduced.

Also referenced herein is a "hub," which is a tubular unit where one or more tubes (e.g., fill tubes or support tubes) are connected to and in fluid communication with at least one input tube that distributes fluid from the input tube to the one or more tubes through the hub. It should be noted, however, that tubes can be connected to one another without a hub.

The following is a brief description of the use, operation, and purpose of the inflatable parachute airbag system described herein. As the use of drones and other unmanned aerial vehicles increases, so too does the risk of inflight failures. Failures can occur in all different types of situations, environments, and vehicle altitudes. And the use of aerial vehicles in urban areas has increased the desire for a system to allow an aerial vehicle that experiences an inflight failure to land without causing harm to people, animals, homes, or other property. Similarly, aerial vehicle owners would like a system that protects the aerial vehicle from extensive damage due to a fall from altitude.

The system includes a detection computer system, sensors, an inflation mechanism or device, and an inflatable parachute airbag assembly. The detection computer system, or control circuitry, is operable to detect an uncontrolled flight condition of the aerial vehicle and to output a signal in response to the detected condition. These detection systems utilize different types of sensors, such as gyroscopes, accelerometers, altimeters, GPS systems, or the like, and algorithms to detect if the aerial vehicle has gone into an uncontrolled condition. An uncontrolled condition may be an uncontrolled descent, an unintentional unpowered descent, other uncontrolled movements, flight of the aerial vehicle into an unapproved or unauthorized location or altitude, etc.

Examples of an uncontrolled flight condition may be that the motor(s) of the aerial vehicle lose power—resulting in a loss of lift to the aerial vehicle. Another uncontrolled flight condition may be that the aerial vehicle stops responding to operating commands from a remote control of a user. In yet another example, the aerial vehicle may be too close to the ground or near structures or is on a collision course with a structure or person. It should be recognized that other uncontrolled or potentially hazardous flight conditions also may be detected by the detection computer system.

Upon detection of an uncontrolled flight condition, the detection computer system outputs a signal that can be used for a variety of different safety measures. For example, the signal can bypass the avionics controller and cut power to the motors, which stops the motors and the attached rotors from spinning. The signal is also received by a controller of the inflation mechanism and is configured to initiate deployment of an inflatable parachute airbag assembly, as described herein. In some implementations, users can manually input, such as from a remote control, the detection signal to initiate deployment of the inflatable parachute airbag assembly.

Upon receiving the fall detection signal, a servo or other controller opens or otherwise activates the inflation mechanism—which is in fluid communication with the inflatable parachute airbag assembly—to inflate, and thus deploy, the inflatable parachute airbag assembly. As described elsewhere, the inflation mechanism may be compressed air, a pump, a solid-propellant inflator, other explosion- or chemical-based inflators, etc.

Prior to deployment, the inflatable parachute airbag assembly is stored in a deflated state in a housing on the aerial vehicle. As described herein, the inflatable parachute airbag assembly includes a plurality of different tubes (e.g., fill tubes, support tubes, perimeter tube, etc.). These tubes may be made of any of a variety of different lightweight materials that are capable of holding air pressure when the inflatable parachute airbag assembly is deployed. Additionally, the tubes are flexible and, when deflated, collapse into a compact form for storage on the aerial vehicle. The inflatable parachute airbag assembly maintains this compact form until inflated.

Upon deployment, an initial burst of gas from the inflation mechanism pushes the inflatable parachute airbag assembly out of its housing and away from aerial vehicle. This burst of gas likewise pushes the aerial vehicle in an opposite direction of the deployment of the inflatable parachute airbag assembly, which helps to create some distance between the aerial vehicle and the inflatable parachute airbag assembly. This partial separation allows the inflatable parachute airbag assembly to proper inflate, pressurize, and fully deploy without interference by the aerial vehicle.

As the tubes of the inflatable parachute airbag assembly are inflated and become pressurized, the entire inflatable parachute airbag assembly expands to a shape pre-defined by its structure. In some implementations, the inflatable parachute airbag assembly expands around the aerial vehicle in a mouth-like motion to fully encase the aerial vehicle in a spherical-like shape. In other implementations, the inflatable parachute airbag assembly does not fully encase the aerial vehicle, but is rather a concave-like structure that is operative as a semi-solid parachute.

In various implementations, the inflatable parachute airbag assembly is a closed assembly so that once inflated and pressurized it remains in that semi-solid state for a suitable amount of time to allow the aerial vehicle to descend and come to rest on the ground.

FIGS. 1A-1D are various views depicting utilization of an inflatable parachute airbag system 112 in accordance with the present disclosure. Many aerial vehicles include one or more mounting brackets for various different types of equipment, such as cameras, payload supports, etc. FIG. 1A shows an aerial vehicle 102 with a mounting bracket 104. In this illustration, the mounting bracket 104 is positioned to the back of the aerial vehicle 102. Attached to the mounting bracket is the inflatable parachute airbag assembly 112. Although the inflatable parachute airbag assembly 112 is positioned in the back of the aerial vehicle 102 for purposes of discussion, it could be attached to other positions of the aerial vehicle, such as on top, in front, on bottom, etc. Additionally, other components (not shown) of the inflatable parachute airbag system may be attached to or embedded in the aerial vehicle. For example, the aerial vehicle may include an on-board detection system and sensors to detect an uncontrolled flight condition. In other implementations, the detection system or the sensors, or both, may be separate from and attached to the aerial vehicle along with the inflatable parachute airbag assembly.

The inflatable parachute airbag assembly 112 is stored in a housing 108 and attached to the bracket 104. The housing 108 is also in fluid communication with an inflation mechanism 106. The inflation mechanism 106 may be compressed air, a pump, a solid-propellant inflator, other explosion- or chemical-based inflators, etc. Upon deployment of the inflatable parachute airbag assembly 112 from the aerial vehicle 102, the inflation mechanism 106 provides gas to the inflatable parachute airbag assembly 112, which inflates and pressurizes the inflatable parachute airbag system 112. It should be recognized that various implementations of the inflatable parachute airbag systems described herein can be similarly attached to and deployed from an aerial vehicle.

FIGS. 1B-1D provide a basic illustration of the deployment of one implementation of the inflatable parachute airbag assembly 112. As gas is transferred from the inflation mechanism 106, it enters a main fill tube 110, which, as described above, pushes the inflatable parachute airbag assembly 112 out of the housing 108 and away from the aerial vehicle. Gas from the inflation tube 110 enters a top hub 118, which distributes the gas into a plurality of support tubes 115, a perimeter tube 113, and two bottom support tubes 114 and 116. The bottom support tubes 114 and 116 guide the inflatable parachute airbag assembly 112 around the aerial vehicle in a mouth-like fashion as they inflate.

Parachute material (not illustrated) is connected to the inflatable parachute airbag assembly 112 around (or inside) the plurality of support tubes 115 between the perimeter tube 116 and the top hub 118 to create a concave-like structure that is operative as a parachute. In some implementations, mesh material (not illustrated) may be connected between the perimeter tube 113 and the bottom support tubes 114 and 116 to provide additional protection to the aerial vehicle while still allowing air to flow into the parachute material. It should be noted that the mesh material is not connected between the bottom support tubes 114 and 116 so as not to interfere with their function of allowing the inflatable parachute airbag assembly to inflate around the aerial vehicle.

Figure 2A:
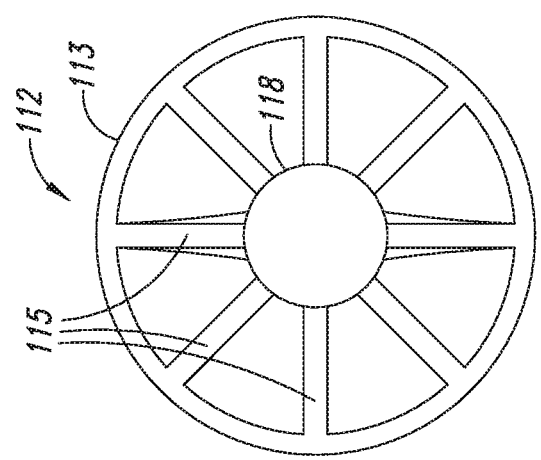

Top and bottom views of the deployed inflatable parachute airbag assembly 112 are illustrated in FIGS. 2A and 2B. As can be seen from these figures, the top hub 118 connects to and is in fluid communication with a plurality of support tubes 115. The plurality of support tubes 115 are also connected to a perimeter tube 113. Also connected to the perimeter tube 113 are the bottom support tubes 114 and 116. The perimeter tube 113 provides transverse support to extend the inflatable parachute airbag assembly away from the aerial vehicle as the bottom support tubes 114 and 116 inflate and the inflatable parachute airbag assembly encases the aerial vehicle.

The remaining illustrations show various implementations of the inflatable parachute airbag assembly in a fully deployed and pressurized state. For ease of illustration, some of the figures do not include the parachute material, or the mesh material, depending on the implementation. Additionally, other components of the inflatable parachute airbag system (e.g., the uncontrolled-flight-condition detection system, sensors, and inflation mechanism) may not be shown or described in order to avoid unnecessarily obscuring descriptions of the implementations of the inflatable airbag assembly.

Figure 3A:
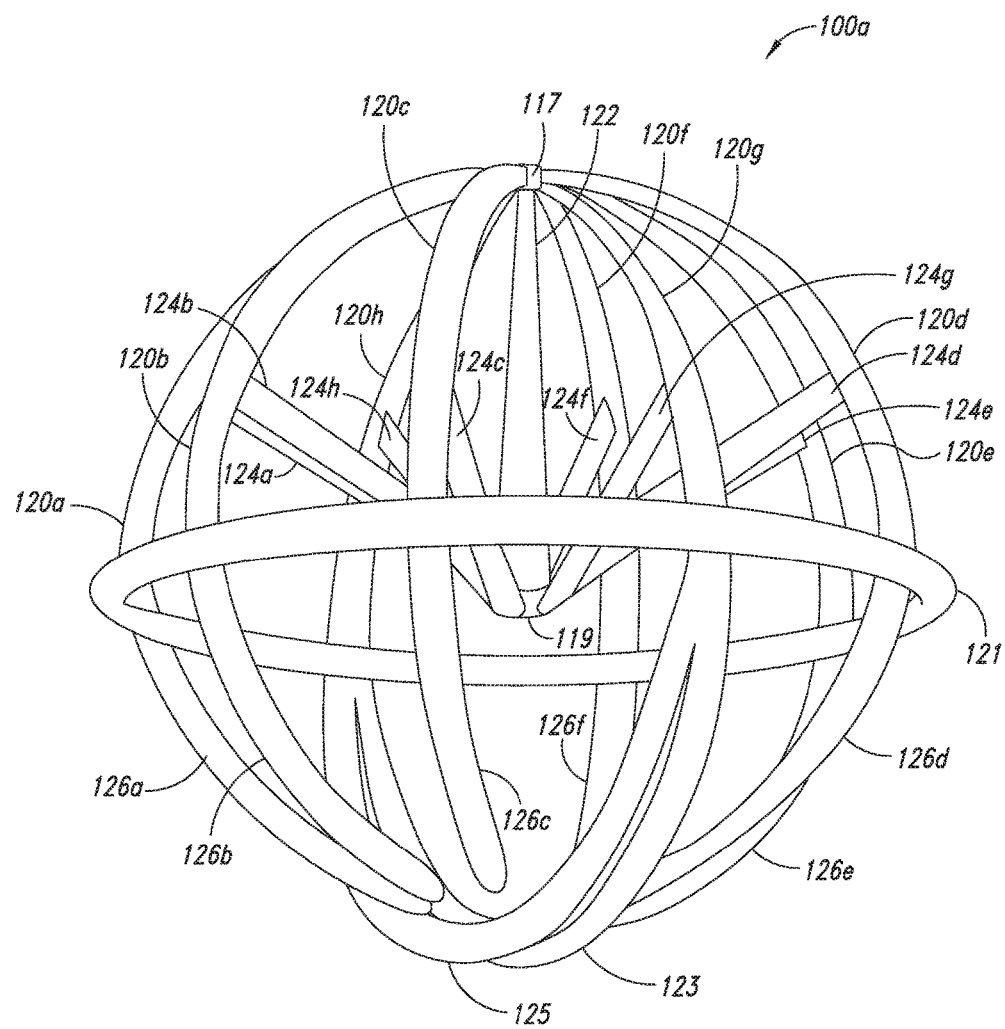

FIGS. 3A-3C are bottom left perspective views of inflatable parachute airbag assemblies 100A-100C, respectively. The inflatable parachute airbag assembly 100A, as illustrated in FIG. 3A, includes a plurality of top support tubes 120a-120h, a main fill tube 122, a plurality of fill tubes 124a-124h, a plurality of bottom support tubes 123, 125, and 126a-126f, and a perimeter tube 121. The inflatable parachute airbag assembly 110A also includes a bottom hub 119 and a top hub 117.

The bottom hub 119 is operative to distribute gas from an inflation mechanism (not illustrated) into the main fill tube 122 and the plurality of fill tubes 124a-124h. In some implementations, the bottom hub 119 provides a connection point for the inflatable parachute airbag assembly 100A to connect to an aerial vehicle.

The main fill tube 122 is connected to and in fluid communication between the bottom hub 119 and the top hub 117. The main fill tube 122 is operative as an input tube to the top hub 117 such that gas passes from the bottom hub 119 to the top hub 117.

The plurality of top support tubes 120a-120h are connected to and in fluid communication with the top hub 117. The top hub 117 is operative to distribute gas from the main fill tube 122 into the plurality of top support tubes 120a-120h. In some implementations, some support tubes of the plurality of top support tubes 120a-120h may be connected to the top hub 117 but not in fluid communication with the top hub 117. In such an implementation, those support tubes may be inflated through respective fill tubes of the plurality of fill tubes 124a-124h, as described below, but not through the top hub 117.

The top hub 117 acts as a central location for the plurality of top support tubes 120a-120h to be connected. It should be noted that the top hub 117 may be a variety of different shapes or structures. For example, the top hub 117 may be a ring or annulus, a square, a triangle, a pentagon, an octagon, or other shape that is operative to connect to and inflate the top support tubes 120a-120h.

The plurality of top support tubes 120a-120h are also connected to and in fluid communication with the perimeter tube 121. The plurality of top support tubes 120a-120h are operative to inflate the perimeter tube 121. In some implementations, some support tubes of the plurality of top support tubes 120a-120h may be connected to the perimeter tube 121 but not in fluid communication with the perimeter tube 121. In such an implementation, the perimeter tube 121 may be inflated through those support tubes that are in fluid communication with the perimeter tube 121 or through a separate fill tube (not illustrated) connected to and in fluid communication with the main fill tube 122 or the bottom hub 119.

Each of the top support tubes 120a-120h is positioned between the top hub 117 and the perimeter tube 121. The top support tubes 120a-120h may be symmetrically positioned radially around a central axis of the perimeter tube 121. In some implementations, a distance between each of the top support tubes 120a-120h may be substantially similar, but other configurations of top support tubes may be utilized. Similarly, although the inflatable parachute airbag assembly 100A is illustrated with eight top support tubes, more or less top support tubes may be utilized such that the top support tubes create a concave-like structure that, when covered by a parachute material, can create drag when the inflatable parachute airbag 100A is deployed from an inflight aerial vehicle.

It should be noted that the concave-like structure created by the top support tubes 120a-120h and the perimeter tube 121 can take on various different three-dimensional shapes. Briefly, for example, the perimeter tube 121 could be an oval, square, annulus, triangle, pentagon, octagon, or other shape, while the top support tubes 120a-120h may be straight, arcuate, or the like and may include a variety of different numbers of support tubes that are positioned radially around a central axis of the perimeter tube 121 such that the resulting concave-like structure may be domelike, conical, pyramidal hexagonal, cubical, frustum-like, etc.

As mentioned above, the plurality of top support tubes 120a-120h are inflated through the top hub 117. The plurality of top support tubes 120a-120h are also inflated via the plurality of fill tubes 124a-124h. The plurality of fill tubes 124a-124h are connected to and in fluid communication with the bottom hub 119. Each of the plurality of fill tubes 124a-124h is also connected to and in fluid communication with a respective support tube of the plurality of top support tubes 120a-120h. The plurality of fill tubes 124a-124h are operative to inflate the plurality of top support tubes 120a-120h.

In various implementations, the fill tubes 124a-124h may connect to a body portion of the top support tubes 120a-120h between the top hub 117 and the perimeter tube 121. For example, the fill tube 124c connects to the bottom hub 119 and the body of the top support tube 120c and is operative to provide gas from the bottom hub 119 to the top support tube 120c. As illustrated, the bottom hub 119 is positioned below (or closer to the perimeter tube 121 than) the connection points of the fill tubes 124a-124h to the top support tubes 120a-120h. However, implementations are not so limited, and other positions of the bottom hub 119 relative to the perimeter tube 121 (e.g., a length of the main fill tube 122) or other positions of the connection points of the fill tubes 124a-124h to the top support tubes 120a-120h may be utilized.

The inflatable parachute airbag assembly 100A also includes a plurality of bottom support tubes 123, 125, and 126a-126f. The ends of each of the bottom support tubes 123 and 125 connect to and are in fluid communication with the perimeter tube 121. The ends of each of the bottom support tubes 123 and 125 are substantially, diametrically opposed relative to a central axis of the perimeter tube 121. In some implementations, the ends of the bottom support tube 123 may merge with respective ends of the bottom support tube 125 such that single merged tubes connect to the perimeter tube 121.

The bottom support tubes 126a-126f are connected to and in fluid communication with the perimeter tube 121. The bottom support tubes 126a-126f extend downwards and away from the perimeter tube 121 towards a central axis of the perimeter tube 121. Unlike the top support tubes 120a-120h that connect to the top hub 117, the bottom support tubes 126a-126f do not connect to one another or to another hub. But implementations are not so limited. For example, the bottom support tubes 126a-126c may be connected to the bottom support tube 125 and the bottom support tubes 126d-126f may be connected to the bottom support tube 126, similar to what is illustrated in FIGS. 1B-1D or described below in conjunction with FIGS. 17A-17E. In such an implementation, the bottom support tubes 126a-126f may or may not be in fluid communication with the bottom support tubes 123 or 125, since the bottom support tubes 123 and 125 are inflated from the perimeter tube 121.

As illustrated, the top support tubes 120a-120h and bottom support tubes 126a-126f, 123, and 125 are separate tubes that connect to the perimeter tube 121 substantially, diametrically opposite of each other. Implementations, however, are not so limited. For example, the inflatable parachute airbag assembly 100A may include a plurality of support tubes (not illustrated) that each includes a respective top support tube of the top support tubes 120a-120f and a respective bottom support tube of the bottom support tubes 126a-126f with a single fluid communication connection with the perimeter tube 121. Such support tubes may be positioned within or outside the central aperture of the perimeter tube 121. It should be noted that various different numbers and configurations of support tubes (e.g., top and bottom support tubes) and perimeter tubes may be employed.

When deployed, the inflation mechanism provides gas to the bottom hub 119, which distributes the gas to the main fill tube 122 and the plurality of fill tubes 124a-124h. By first distributing the gas to the main fill tube 122 and the plurality of fill tubes 124a-124h, the inflatable parachute airbag assembly 100A is pushed in a direction of the top hub 117, which pushes the inflatable parachute airbag assembly 100A and the aerial vehicle away from each other—creating an initial separation between the aerial vehicle and the top hub 117. The main fill tube 122 and the plurality of fill tubes 124a-124h then inflate the top support tubes 120a-120h, the perimeter tube 121, the bottom support tubes 123 and 125, and the bottom support tubes 126a-126f. The initial separation of the aerial vehicle and the top hub 117 allows for the support tubes and the perimeter tube to fully inflate such that the inflatable parachute airbag assembly 100A deploys around the aerial vehicle without interference by the aerial vehicle.

FIG. 3B illustrates an inflatable parachute airbag assembly 100B, which is an implementation of the inflatable parachute airbag assembly 100A shown in FIG. 3A. But the inflatable parachute airbag assembly 100B includes a parachute material 129 on a top portion 127 of the inflatable parachute airbag assembly 100B. The parachute material 129 can be positioned and connected to an outside, as illustrated, or an inside of the top support tubes relative to the main fill tube such that air pushes against the parachute material when deployed. The parachute material can be any of a variety of lightweight materials that can be used to create drag.

Upon deployment of the inflatable parachute airbag assembly 100B, air flows through the spaces between the bottom support tubes of the bottom portion 128 (because there is no parachute material 129 on the bottom portion 128) and into the concave-like structure of the top portion 127, which creates drag on the parachute material 129. This drag slows the descent of the aerial vehicle, which can reduce damage to objects or people on the ground, as well as to the aerial vehicle itself.

FIG. 3C illustrates an inflatable parachute airbag assembly 100C, which is an implementation of the inflatable parachute airbag assembly 100B shown in FIG. 3B. But the inflatable parachute airbag assembly 100C also includes a mesh material 130 on the bottom portion 128 of the inflatable parachute airbag assembly 100C. The mesh material 130 can be positioned and connected to an outside or an inside of the support tubes relative to the main fill tube such that air pushes against the parachute material when deployed. The mesh material can be any of a variety of lightweight materials that are air permeable.

Upon deployment of the inflatable parachute airbag assembly 100C, air flows through the mesh material 130 and into the concave-like structure of the top portion 127, which creates drag on the parachute material 129. The mesh material 130 also provides additional protection to the aerial vehicle encased in the inflatable parachute airbag assembly 100C so that tree branches and other debris do not impact the aerial vehicle as it descends to the ground. Similarly, the mesh material 130 adds additional protection so that if the rotors are still turning, they do not pose an additional hazard to people or objects on the ground.

FIGS. 4-7 illustrate various other views of the inflatable parachute airbag assembly 100A shown in FIG. 3A. As illustrated, the top support tubes 120a-120h are connect at one end to the top hub 117 and at the other end to the perimeter tube 121. The fill tubes 124a, 124b, 124c, 124d, 124e, 124f, 124g, and 124h connect to the top support tubes 120a, 120b, 120c, 120d, 120e, 120f, 120g, and 120h, respectively, and enable gas to flow into and inflate the respective support tubes.

The bottom support tubes 126a-126f connect at one end to the perimeter tube 121 and the other end is sealed and terminates near the bottom support tubes 123 and 125. But, as described above, in some implementations, the bottom support tubes 126a-126c and 126d-126f connect to the bottom support tubes 125 and 123, respectively. As described above, the ends of the bottom support tubes 125 and 123 connect to the perimeter tube 121 such that their ends are substantially, diametrically opposed relative to a central axis of the perimeter tube 121, which creates a void longitudinally between the bottom support tubes 125 and 123.

As the inflatable parachute airbag assembly 100A inflates upon deployment, the bottom support tubes 125 and 123 inflate in opposite directions of each other (e.g., increasing the void between them during the inflation process), enabling the inflatable parachute airbag assembly 100A to inflate and envelop the aerial vehicle in a mouth-like fashion before coming back together (e.g., decreasing the void between them once substantially inflated). Once fully inflated, the bottom support tubes 125 and 123 are positioned adjacent to one another. In some implementations, the bottom support tubes 125 and 123 may include additional removable connectors to attach to one another, such as hook and loop connectors, motorized clasp locker or slide fastener, etc.

Figure 4:
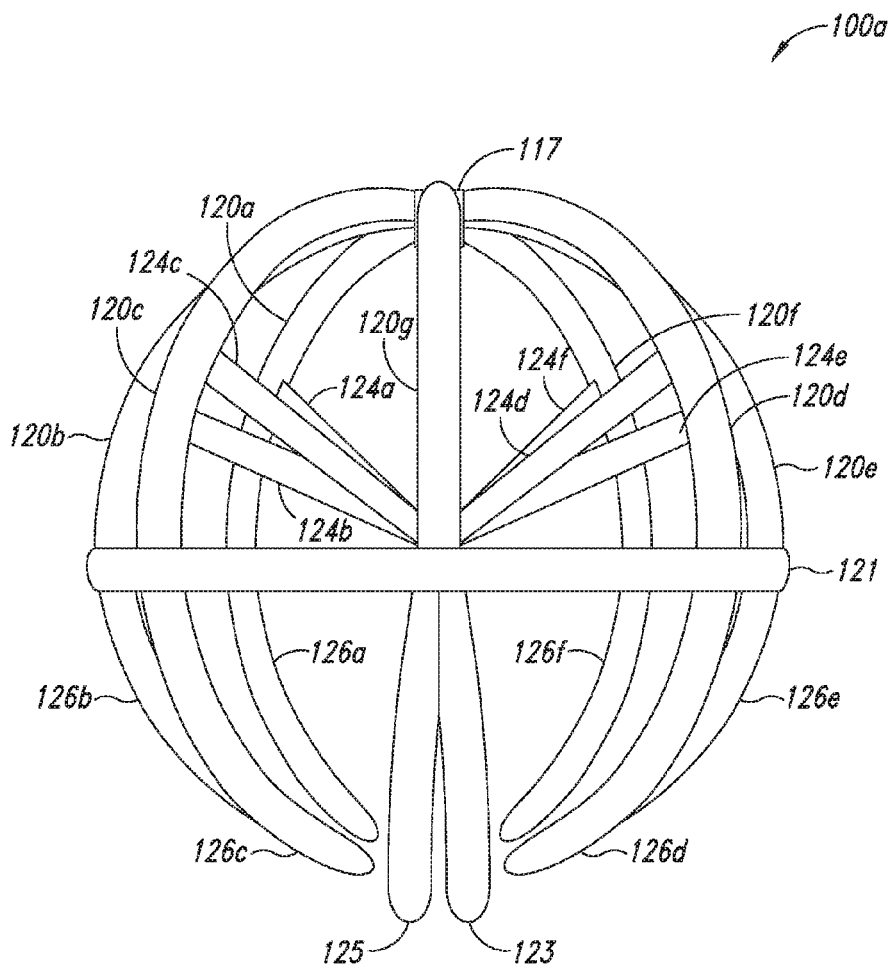
FIG. 4 is a front view of the inflatable parachute airbag system shown in FIG. 3A.
Figure 5:
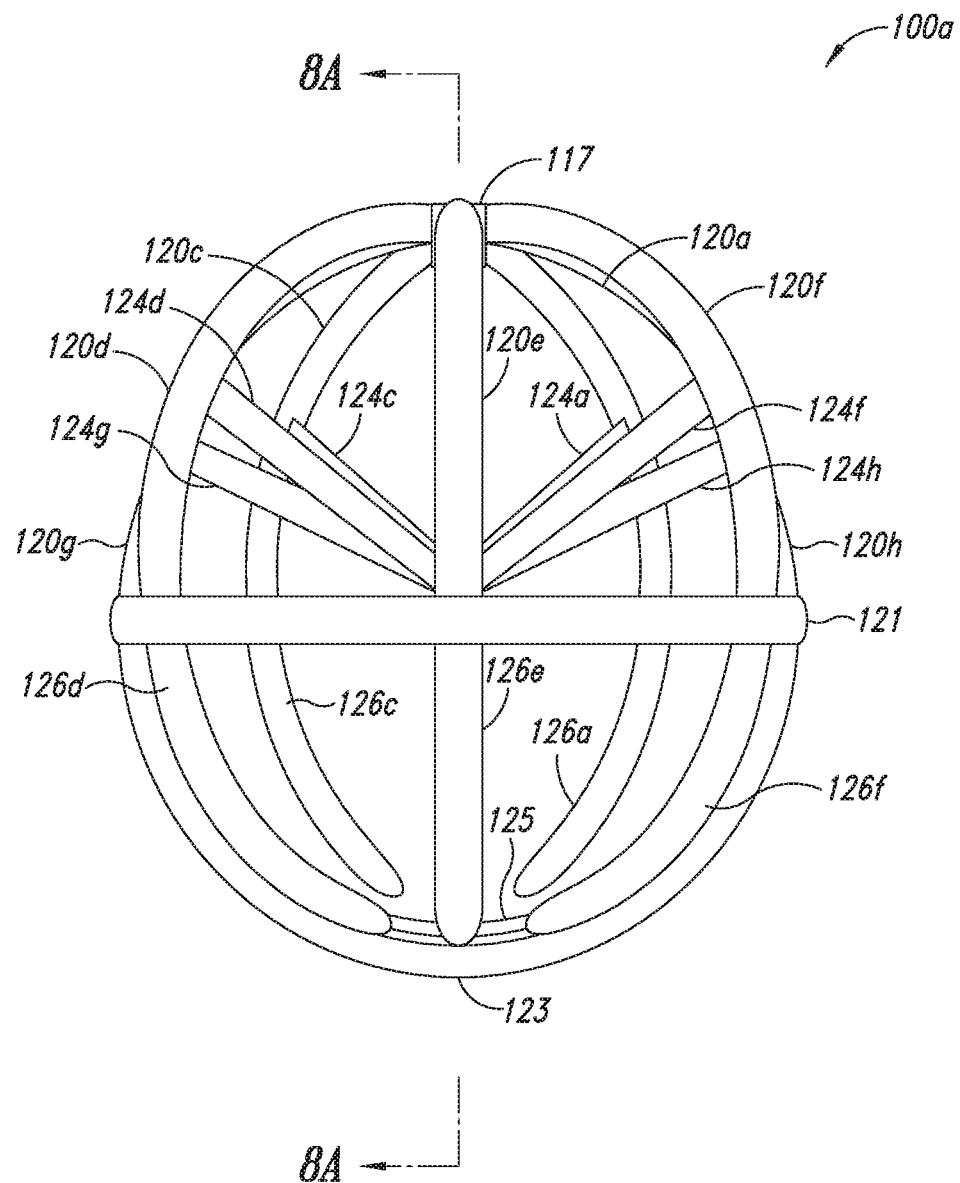
FIG. 5 is a right view of the inflatable parachute airbag assembly shown in FIG. 3A.
Figure 6:
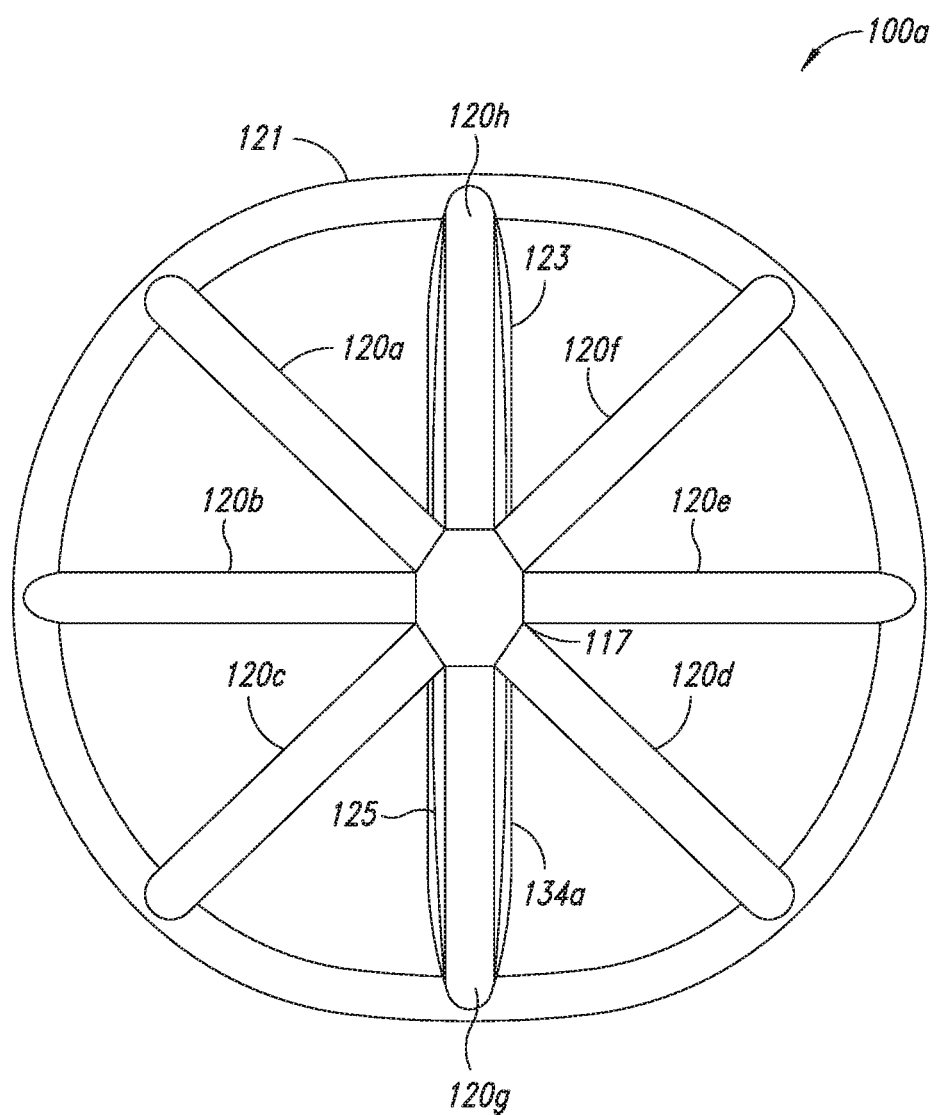
FIG. 6 is a top view of the inflatable parachute airbag assembly shown in FIG. 3A.
Figure 7:
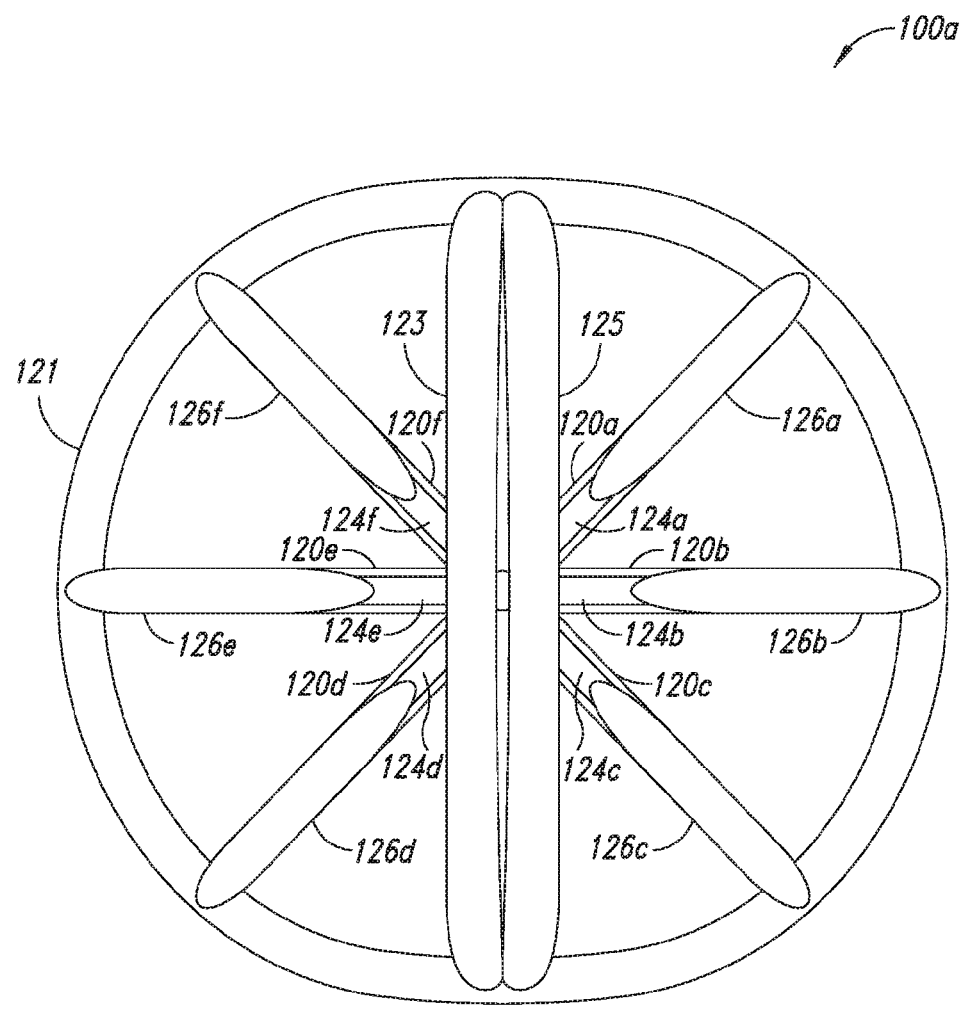
FIG. 7 is a bottom view of the inflatable parachute airbag assembly shown in FIG. 3A.

It should be noted that a back view of the inflatable parachute airbag assembly 100A would substantially mirror the front view illustrated in FIG. 4. Similarly, a left view of the inflatable parachute airbag assembly 100A would substantially mirror the right view illustrated in FIG. 5.

Figure 8A:
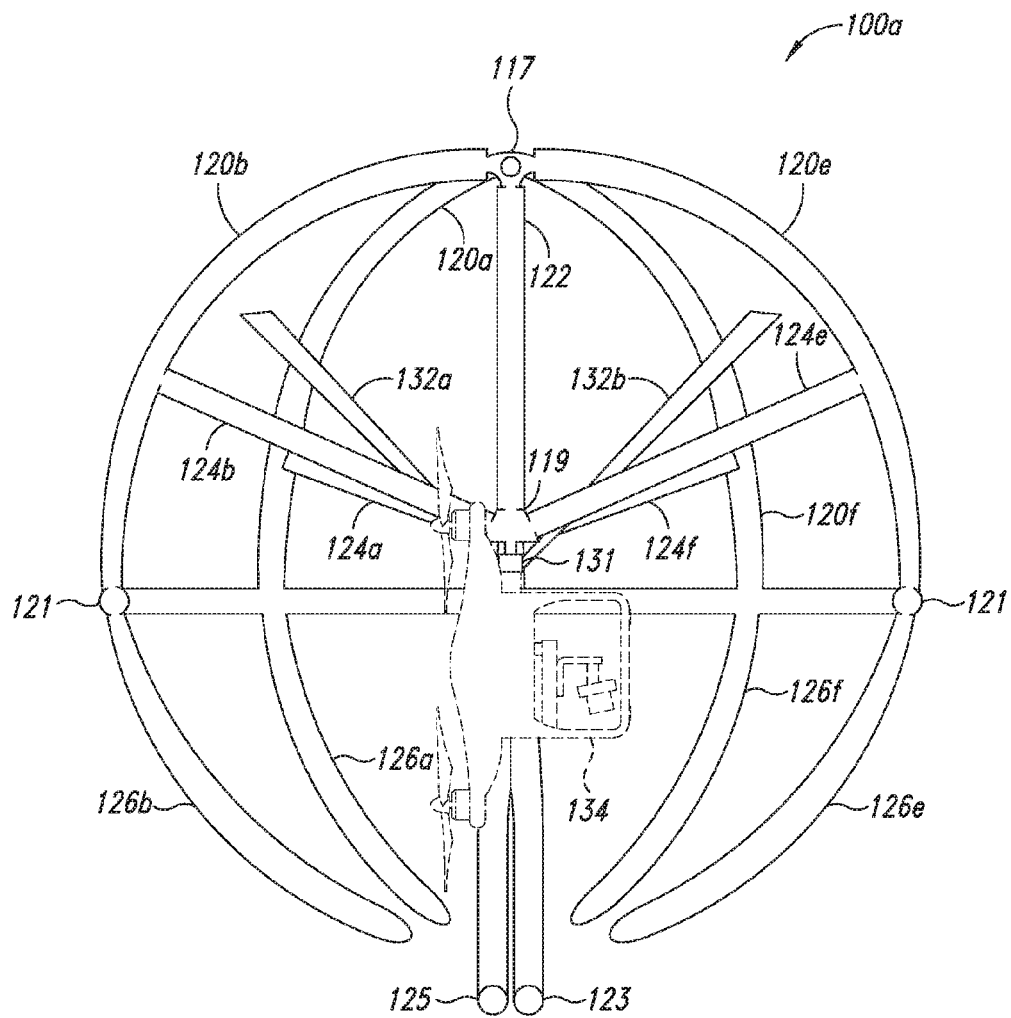
FIG. 8A is a front cross-section view of the inflatable parachute airbag assembly shown in FIG. 3A.

FIG. 8A is a front cross-section view of the inflatable parachute airbag assembly 100A, as described above. Many of the details of the inflatable parachute airbag assembly 100A are not reiterated here, but briefly, a housing 131 stores the inflatable parachute airbag assembly 100A in an uninflated state, and may contain an inflation mechanism (not illustrated). The housing 131 may be a variation of the housing 108 in FIG. 1A and physically coupled to an aerial vehicle 134.

As described herein, when a fall of the aerial vehicle 134 is detected, the inflatable parachute airbag assembly 100A is deployed and inflated. The main fill tube 122 and the fill tubes 124a, 124b, 124e, and 124h are inflated via the bottom hub 119, which is in fluid communication with the inflation mechanism. The top support tubes 120a, 120b, 120e, and 120f connect between the top hub 117 and the perimeter tube 121. The top support tubes 120a, 120b, 120e, and 120f are inflated via the fill tubes 124a, 124b, 124e, and 124f, respectively, and via the top hub 117. The bottom support tubes 126a, 126b, 126e, and 126f are connected to the perimeter tube 121 and extend downwards and away from the perimeter tube towards a central axis of the perimeter tube 121. And each of the bottom support tubes 123 and 125 connect to the perimeter tube 121 in an arcuate structure to provide a mouth-like aperture to enable the inflatable parachute airbag assembly 100A to inflate around the aerial vehicle 134.

The inflatable parachute airbag assembly 100A also includes a plurality of support straps 132a-132b coupled between the aerial vehicle 134 and the inflatable parachute airbag assembly 100A. The support straps 132a-132b may be selected from variety of different suitable lightweight materials that are strong enough to resist breaking while keeping the inflatable parachute airbag assembly 100A attached to the aerial vehicle 134 as the aerial vehicle 134 and the deployed inflatable parachute airbag assembly 100A descend to the ground. Although the cross-section view only shows two support straps, a plurality of support straps are distributed substantially evenly and radially around the center axis of the perimeter tube 121 to provide stabilization and support for the deployed inflatable parachute airbag assembly 100A and the aerial vehicle 134.

In various implementations, one end of the support straps 132a-132b connects to the housing 131, which is connected to the aerial vehicle 134. In other implementations, the support straps 132a-132b may be directly connected to the aerial vehicle 134 rather than to the housing 131. The other end of the support straps 132a-132b connects to the parachute material (not illustrated), which is illustrated in FIGS. 8B-8C. In other implementations, the support straps 132a-132b may be connected to some of the top support tubes 120a, 120b, 120e, and 120f such that the support straps are distributed substantially evenly and radially around the center axis of the perimeter tube 121.

FIG. 8B is a front cross-section view of the inflatable parachute airbag assembly 100B, as described above. As illustrated, the support straps 132a-132b connect to the parachute material 129 in the top portion 127 of the inflatable parachute airbag assembly 100B, while the bottom portion 128 is open to allow air to flow into the inflatable parachute airbag assembly 100B and create drag on the parachute material 129, as described above in conjunction with FIG. 3B. It should be noted that no parachute material is positioned planar to and inside the central opening of the perimeter tube 121.

FIG. 8C is a front cross-section view of the inflatable parachute airbag assembly 100C, as described above. Similar to what is illustrated in FIG. 8B, the support straps 132a-132b connect to the parachute material 129 in the top portion 127 of the inflatable parachute airbag assembly 100B. In some implementations, the mesh material 130 may cover the bottom portion 128 to provide additional protection of the aerial vehicle while still allowing air to flow into the inflatable parachute airbag assembly 100B and create drag on the parachute material 129, as described above in conjunction with FIG. 3C. As noted in the illustration, there is no mesh material 130 between the bottom support tubes 123 and 125.

Figure 9:
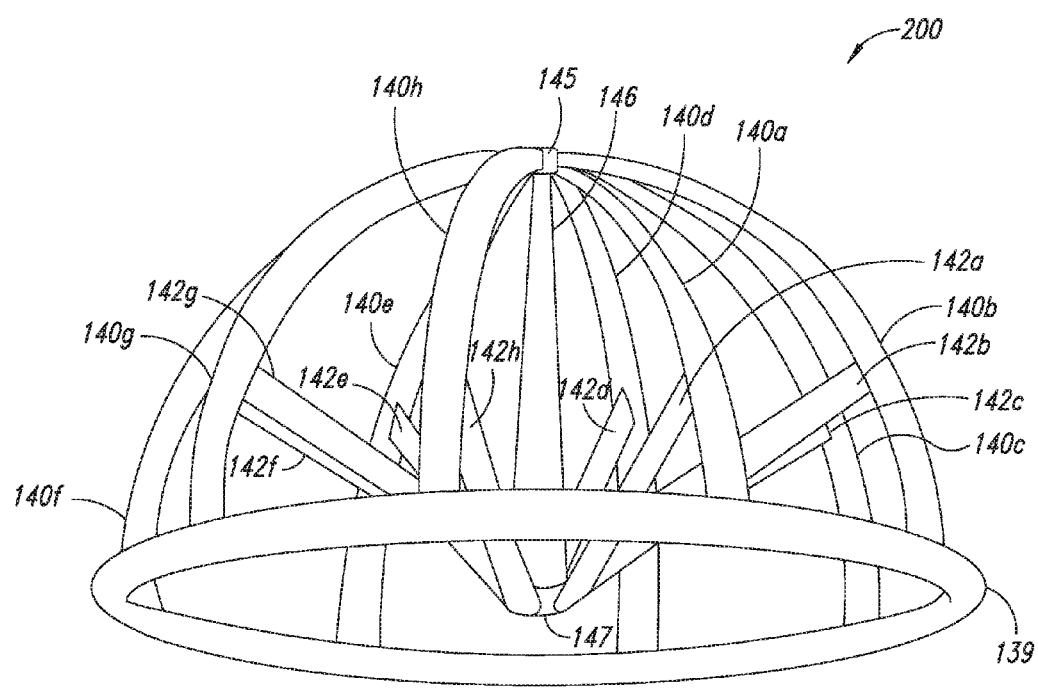
FIG. 9 is a bottom left perspective view of an alternative inflatable parachute airbag assembly in accordance with the present disclosure.

FIG. 9 is a bottom left perspective view of an alternative inflatable parachute airbag assembly 200. The inflatable parachute airbag assembly 200 includes a plurality of support tubes 140a-140h, a main fill tube 146, a plurality of fill tubes 142a-142h, and a perimeter tube 139. The inflatable parachute airbag assembly 200 also includes a bottom hub 147 and a top hub 145. The plurality of support tubes 140a-140h, the main fill tube 146, the plurality of fill tubes 142a-142h, the perimeter tube 139, the bottom hub 147, and the top hub 145 are variations of the plurality of top support tubes 120a-120h, the main fill tube 122, the plurality of fill tubes 124a-124h, the perimeter tube 121, the bottom hub 119, and the top hub 117 illustrated in FIG. 3A.

The bottom hub 147 is operative to distribute gas from an inflation mechanism (not illustrated) into the main fill tube 146 and the plurality of fill tubes 142a-142h. In some implementations, the bottom hub 147 provides a connection point for the inflatable parachute airbag assembly 200 to connect to an aerial vehicle.

The main fill tube 146 is connected to and in fluid communication between the bottom hub 147 and the top hub 145. The main fill tube 146 is operative as an input tube to the top hub 145 such that gas passes from the bottom hub 147 to the top hub 145.

The plurality of support tubes 140a-140h are connected to and in fluid communication with the top hub 145. The top hub 145 is operative to distribute gas from the main fill tube 146 into the plurality of support tubes 140a-140h. In some implementations, some support tubes of the plurality of support tubes 140a-140h may be connected to the top hub 145 but not in fluid communication with the top hub 145. In such an implementation, those support tubes may be inflated through respective fill tubes of the plurality of fill tubes 142a-142h, as described below, but not through the top hub 145.

The top hub 145 acts as a central location for the plurality of support tubes 140a-140h to be connected. It should be noted that the top hub 145 may be a variety of different shapes or structures. For example, the top hub 145 may be a ring or annulus, a square, a triangle, a pentagon, an octagon, or other shape that is operative to connect to and inflate the support tubes 140a-140h.

The plurality of support tubes 140a-140h are also connected to and in fluid communication with the perimeter tube 139. The plurality of support tubes 140a-140h are operative to inflate the perimeter tube 139. In some implementations, some support tubes of the plurality of support tubes 140a-140h may be connected to the perimeter tube 139 but not in fluid communication with the perimeter tube 139. In such an implementation, the perimeter tube 139 may be inflated through those support tubes that are in fluid communication with the perimeter tube 139 or through a separate fill tube (not illustrated) connected to and in fluid communication with the main fill tube 146 or the bottom hub 147.

Each of the support tubes 140a-140h is positioned between the top hub 145 and the perimeter tube 139. The support tubes 140a-140h may be symmetrically positioned radially around a central axis of the perimeter tube 139. In some implementations, a distance between each of the support tubes 140a-140h may be substantially similar, but other configurations of support tubes may be utilized. Similarly, although the inflatable parachute airbag assembly 200 is illustrated with eight support tubes, more or less support tubes may be utilized such that the support tubes create a concave-like structure that, when covered by a parachute material, can create drag when the inflatable parachute airbag assembly 200 is deployed from an aerial vehicle.

It should be noted that the concave-like structure created by the support tubes 140a-140h and the perimeter tube 139 can take on various different three-dimensional shapes. Briefly, for example, the perimeter tube 139 could be an oval, square, annulus, triangle, pentagon, octagon, or other shape, while the support tubes 140a-140h may be straight, arcuate, or the like and may include a variety of different numbers of support tubes that are positioned radially around a central axis of the perimeter tube 139 such that the resulting concave-like structure may be domelike, conical, pyramidal hexagonal, cubical, frustum-like, etc.

As mentioned above, the plurality of support tubes 140a-140h are inflated through the top hub 145. The plurality of support tubes 140a-140h are also inflated via the plurality of fill tubes 142a-142h. The plurality of fill tubes 142a-142h are connected to and in fluid communication with the bottom hub 147. Each of the plurality of fill tubes 142a-142h is also connected to and in fluid communication with a respective support tube of the plurality of support tubes 140a-140h. The plurality of fill tubes 142a-142h are operative to inflate the plurality of support tubes 140a-140h.

In various implementations, the fill tubes 142a-142h may connect to a body portion of the support tubes 140a-140h between the top hub 145 and the perimeter tube 139. For example, the fill tube 142a connects to the bottom hub 147 and the body of the support tube 140a and is operative to provide gas from the bottom hub 147 to the support tube 140a. As illustrated, the bottom hub 147 is positioned below (or closer to the perimeter tube 139 than) the connection points of the fill tubes 142a-142h to the support tubes 140a-140h. However, implementations are not so limited, and other positions of the bottom hub 147 relative to the perimeter tube 139 (e.g., a length of the main fill tube 146) or other positions of the connection points of the fill tubes 142a-142h to the support tubes 140a-140h may be utilized.

When deployed, the inflation mechanism provides gas to the bottom hub 147, which distributes the gas to the main fill tube 146 and the plurality of fill tubes 142a-142h. By first distributing the gas to the main fill tube 146 and the plurality of fill tubes 142a-142h, the inflatable parachute airbag assembly 200 is pushed in a direction of the top hub 145, which pushes the inflatable parachute airbag assembly 200 and the aerial vehicle away from each other—creating an initial separation between the aerial vehicle and the top hub 145. The main fill tube 146 and the plurality of fill tubes 142a-142h then inflate the support tubes 140a-140h and the perimeter tube 139, respectively. The initial separation of the aerial vehicle and the top hub 145 allows for the support tubes 140a-140h and the perimeter tube 139 to fully inflate such that the inflatable parachute airbag assembly 200 deploys without interference by the aerial vehicle.

Although not illustrated in FIG. 9, for clarity of the figure, the inflatable parachute airbag assembly 200 also includes a parachute material. The parachute material would be similar to the parachute material 129 on the top portion 127 of the inflatable parachute airbag assembly 100B in FIG. 3B. The parachute material can be positioned and connect to the support tubes on the outside or inside of the support tubes relative to the main fill tube such that air pushes against the parachute material when deployed. It should be noted that no parachute material is positioned planar to and inside the central opening of the perimeter tube 139. The parachute material can be any of a variety of lightweight materials that can be used to create drag.

Upon deployment of the inflatable parachute airbag assembly 200, air flows through a central opening of the perimeter tube 139 and into the concave-like structure created by the support tubes 140a-140h, which creates drag on the parachute material. This drag slows the descent of the aerial vehicle, which can reduce damage to objects or people on the ground, as well as to the aerial vehicle itself.

FIGS. 10-13 illustrate various other views of the inflatable parachute airbag assembly 200 shown in FIG. 9. As illustrated, the support tubes 140a-140h are connected at one end to the top hub 145 and at the other end to the perimeter tube 139. The fill tubes 142a, 142b, 142c, 142d, 142e, 142f, 142g, and 1424h connect to the top support tubes 140a, 140b, 140c, 140d, 140e, 140f, 140g, and 140h, respectively, and enable gas to flow into and inflate the respective support tubes.

Figure 10:
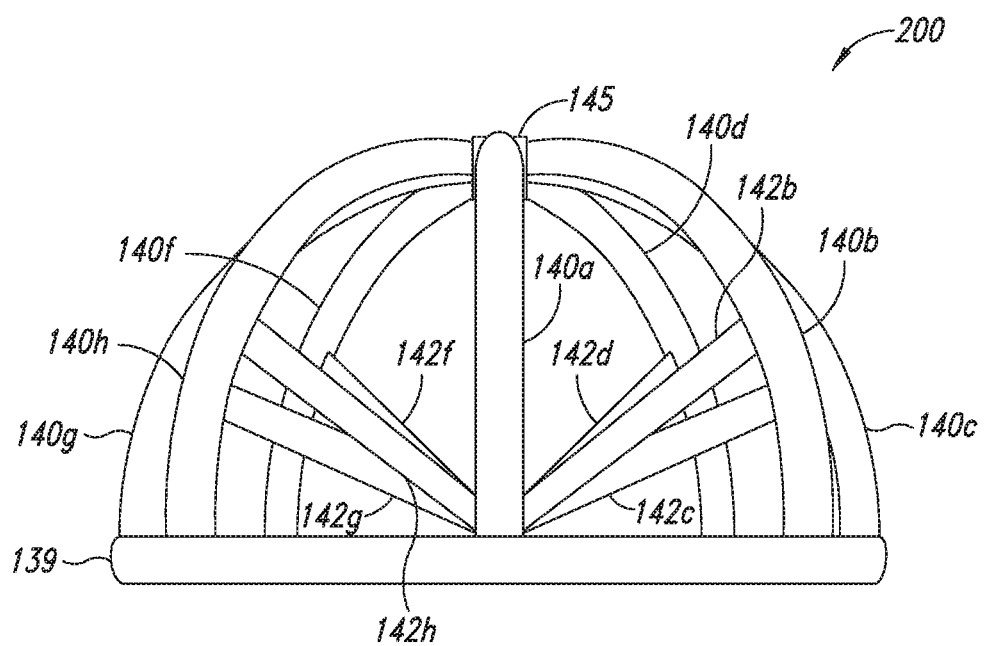
FIG. 10 is a front view of the inflatable parachute airbag assembly shown in FIG. 9.
Figure 11:
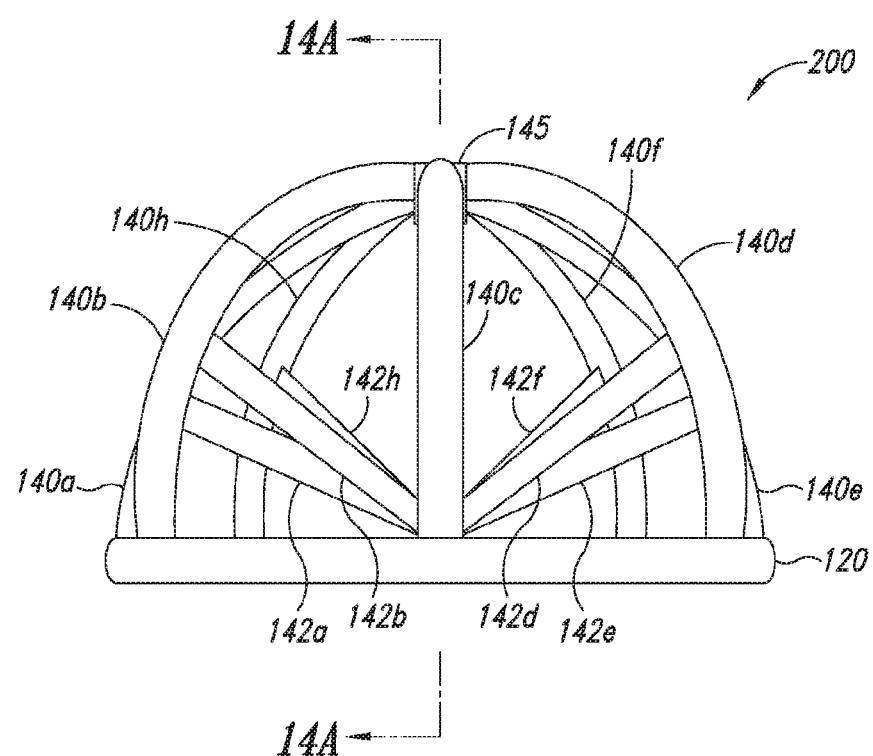
FIG. 11 is a right view of the inflatable parachute airbag assembly shown in FIG. 9.
Figure 12:
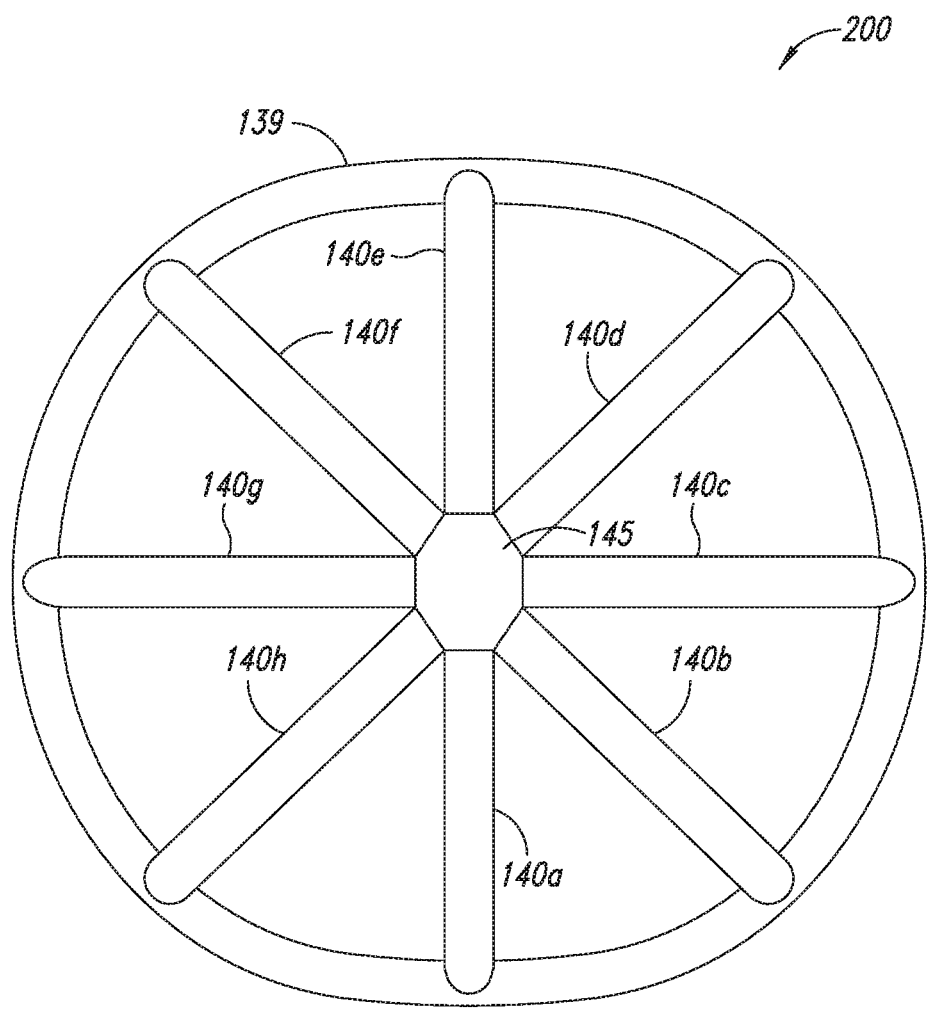
FIG. 12 is a top view of the inflatable parachute airbag assembly shown in FIG. 9.
Figure 13:
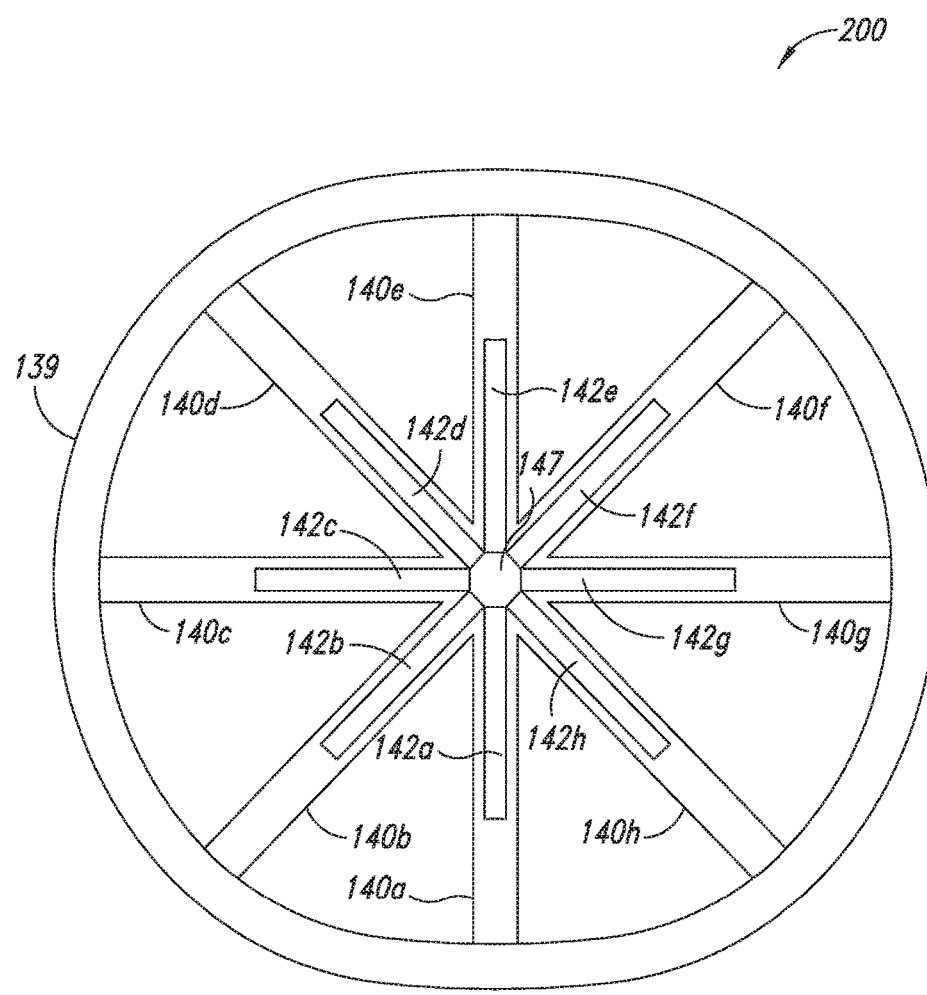
FIG. 13 is a bottom view of the inflatable parachute airbag assembly shown in FIG. 9.

It should be noted that a back view of the inflatable parachute airbag assembly 200 would substantially mirror the front view illustrated in FIG. 10. Similarly, a left view of the inflatable parachute airbag assembly 200 would substantially mirror the right view illustrated in FIG. 11.

Figure 14A:
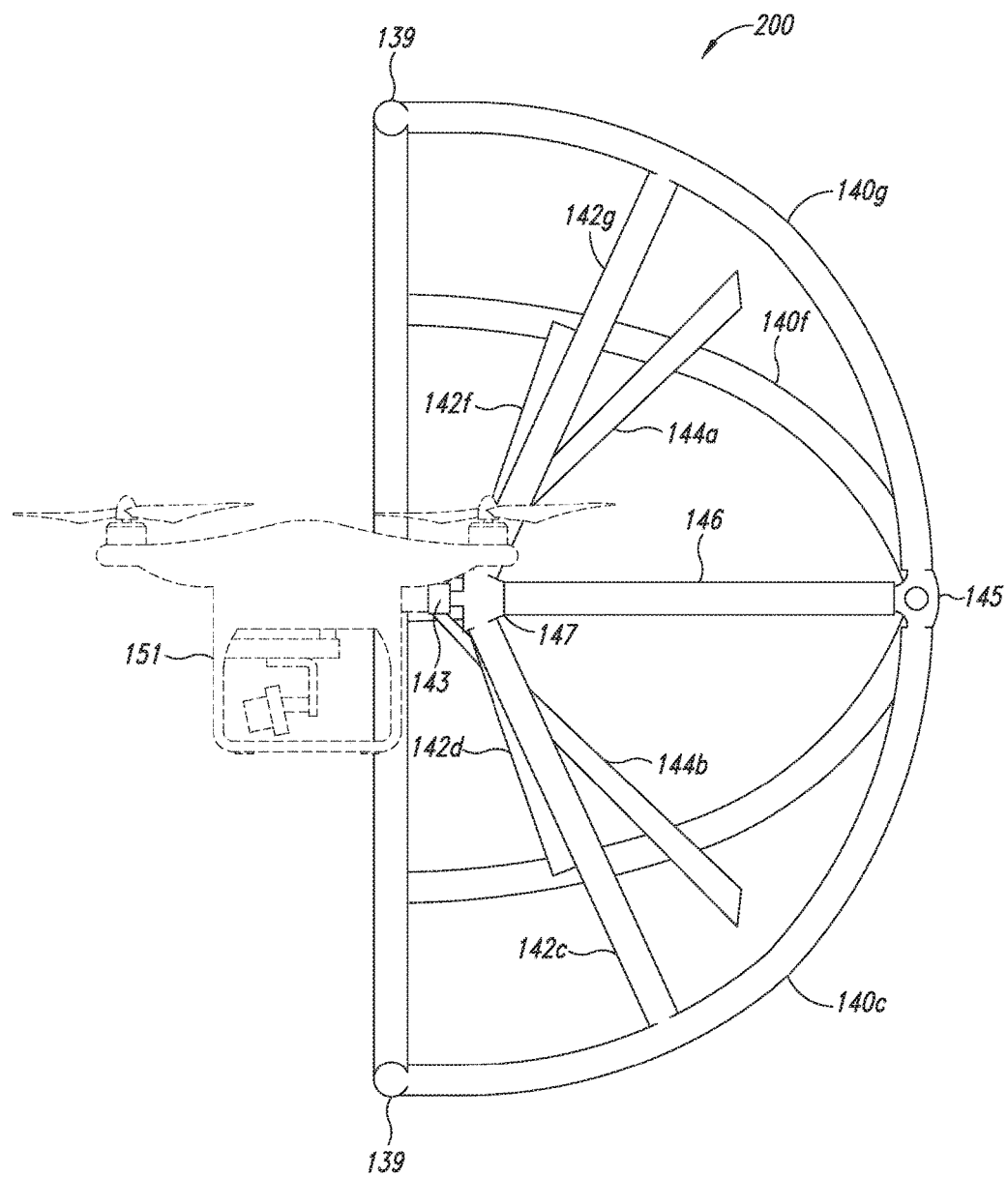

FIGS. 14A and 14B are front cross-section views of the inflatable parachute airbag assembly 200, as described above. Many of the details of the inflatable parachute airbag assembly 200 are not reiterated here, but briefly, a housing 143 is included in the system that is configured to store the inflatable parachute airbag assembly 200 in an uninflated state, and may contain an inflation mechanism (not illustrated). The housing 143 may be a variation of the housing 131 in FIG. 8A and physically coupled to an aerial vehicle 151.

As described herein, when a fall of the aerial vehicle 151 is detected, the inflatable parachute airbag assembly 200 is deployed and inflated. The main fill tube 146 and the fill tubes 142c, 142d, 142f, and 142g are inflated via the bottom hub 147, which is in fluid communication with the inflation mechanism. The support tubes 140c, 140d, 140f, and 140g connect between the top hub 145 and the perimeter tube 139.

The support tubes 140c, 140d, 140f, and 140g are inflated via the fill tubes 142c, 142d, 142f, and 142g, respectively, and via the top hub 145.

The inflatable parachute airbag assembly 200 also includes a plurality of support straps 144a-144b coupled between the aerial vehicle 151 and the inflatable parachute airbag assembly 200. The support straps 144a-144b may be selected from variety of different suitable lightweight materials that are strong enough to resist breaking while keeping the inflatable parachute airbag assembly 200 attached to the aerial vehicle 151 as the aerial vehicle 151 and the deployed inflatable parachute airbag assembly 200 descend to the ground. Although the cross-section view only shows two support straps, a plurality of support straps are distributed substantially evenly and radially around the center axis of the perimeter tube 139 to provide stabilization and support for the deployed inflatable parachute airbag assembly 200 and the aerial vehicle 151.

In various implementations, one end of the support straps 144a-144b connects to the housing 143, which is connected to the aerial vehicle 151. In other implementations, the support straps 144a-144b may be directly connected to the aerial vehicle 151 rather than to the housing 143. The other end of the support straps 144a-144b connects to the parachute material (not illustrated), which is illustrated in FIG. 14B. In other implementations, the support straps 144a-144b may be connected to some of the support tubes 140c, 140d, 140f, and 140g such that the support straps are distributed substantially evenly and radially around the center axis of the perimeter tube 139.

As illustrated in FIG. 14B, the support straps 144a-144b connect to the parachute material 149 while the aperture at the center axis of the perimeter tube 139 is open to allow air to flow into the inflatable parachute airbag assembly 200 and create drag on the parachute material 149.

FIGS. 15A-15C are various views of an inflatable parachute airbag assembly 300. The inflatable parachute airbag assembly 300 is an alternative implementation of the inflatable parachute airbag assembly 200 illustrated in FIG. 9. The inflatable parachute airbag assembly 300 includes a plurality of support tubes 152a-152h, a main fill tube 154, a perimeter tube 150, and a hub 153, which are variations of the plurality of support tubes 140a-140h, the main fill tube 146, the perimeter tube 139, and the top hub 145 illustrated in FIG. 9, respectively.

The main fill tube 154 is connected to and in fluid communication between an inflation mechanism (not shown) and the hub 153. The main fill tube 154 is operative as an input tube to the hub 153 such that gas passes from the inflation mechanism to the hub 153.

Similar to that which is described above in conjunction with FIG. 9, each of the support tubes 152a-152h is positioned between the hub 153 and the perimeter tube 150. The plurality of support tubes 152a-152h are connected to and in fluid communication with the hub 153. The hub 153 is operative to distribute gas from the main fill tube 154 into the plurality of support tubes 152a-152h. The hub 153 also acts as a central location for the plurality of support tubes 152a-152h to be connected. It should be noted that the hub 153 may be a variety of different shapes or structures. For example, the hub 153 may be a ring or annulus, a square, a triangle, a pentagon, an octagon, or other shape that is operative to connect to and inflate the support tubes 152a-152h.

The plurality of support tubes 152a-152h are also connected to and in fluid communication with the perimeter tube 150. At least some of the plurality of support tubes 152*a*-152*h* are operative to inflate the perimeter tube 150. In this implementation, the perimeter tube 150 is octagonal, rather than annulus as illustrated in FIG. 9.

The support tubes 152*a*-152*h* may be symmetrically positioned radially around a central axis of the perimeter tube 150. In some implementations, each of the support tubes 152*a*-152*h* may be positioned at each vertex of the perimeter tube 150. However, implementations are not so limited, and other configurations of support tubes may be implemented. For example, the support tubes may connect to a center of each edge, rather than the vertices. The resulting structure of the inflatable parachute airbag assembly 300 is a concave-like structure that, when covered by a parachute material, can create drag when the inflatable parachute airbag assembly 300 is deployed from an aerial vehicle.

Although not illustrated in FIGS. 15A-15C, for clarity of the figures, the inflatable parachute airbag assembly 300 also includes a parachute material. The parachute material would be similar to the parachute material 129 on the top portion 127 of the inflatable parachute airbag assembly 100B in FIG. 3B. The parachute material can be positioned and connect to the support tubes on the outside or inside of the support tubes relative to the main fill tube such that air pushes against the parachute material when deployed. It should be noted that no parachute material is positioned planar to and inside the central opening of the perimeter tube 150. The parachute material can be any of a variety of lightweight materials that can be used to create drag.

When deployed, the system includes an inflation mechanism that provides gas to the main fill tube 154, which distributes the gas to the hub 153. By distributing the gas to the main fill tube 146 and the hub 153 first, the inflatable parachute airbag assembly 300 is pushed in a direction of the hub 153, which pushes the inflatable parachute airbag assembly 300 and the aerial vehicle away from each other— creating an initial separation between the aerial vehicle and the hub 153. The main fill tube 154 then inflates the support tubes 152*a*-152*h*, via the hub 153, and the perimeter tube 150, via the support tubes. The initial separation of the aerial vehicle and the hub 153 allows for the support tubes 152*a*-152*h* and the perimeter tube 150 to fully inflate such that the inflatable parachute airbag assembly 300 deploys without interference by the aerial vehicle. Air can then flow through a central opening of the perimeter tube 150 and into the concave-like structure created by the support tubes 152*a*-152*h*, which creates drag on the parachute material. This drag slows the descent of the aerial vehicle, which can reduce damage to objects or people on the ground, as well as to the aerial vehicle itself.

Although not illustrated, the inflatable parachute airbag assembly 300 may also include bottom fill tubes similar to what is described above in conjunction with FIGS. 3A-3C so as to encase an aerial vehicle upon deployment.

It should be noted that a left view, right view, and back view of the inflatable parachute airbag assembly 300 would substantially mimic the front view illustrated in FIG. 15C.

Figure 16B:
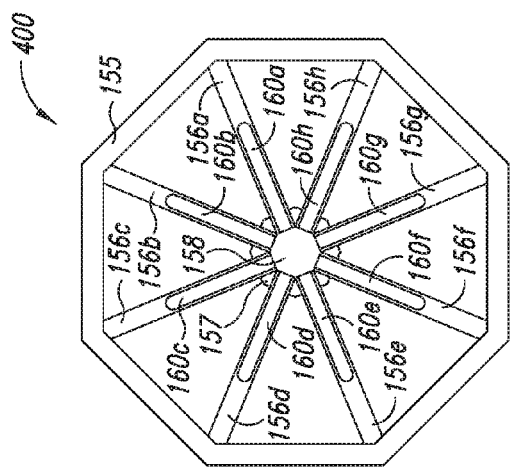
FIGS. 16A-16C are various views of an alternative inflatable parachute airbag assembly in accordance with the present disclosure.
Figure 16C:
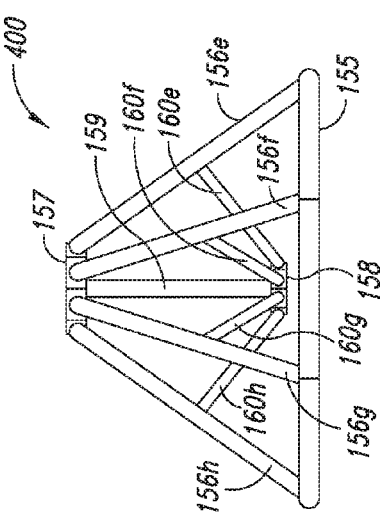
Figure 16A:
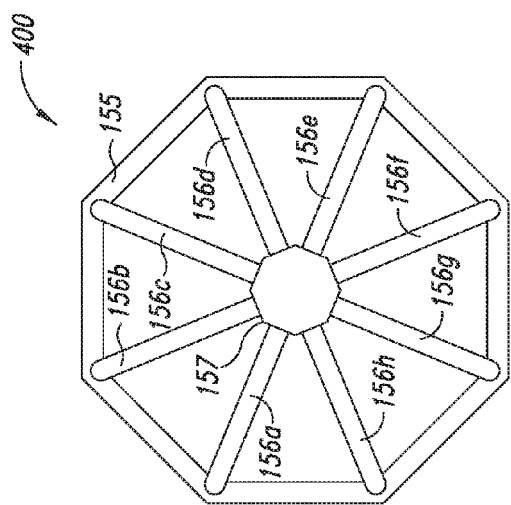
Figure 17A:
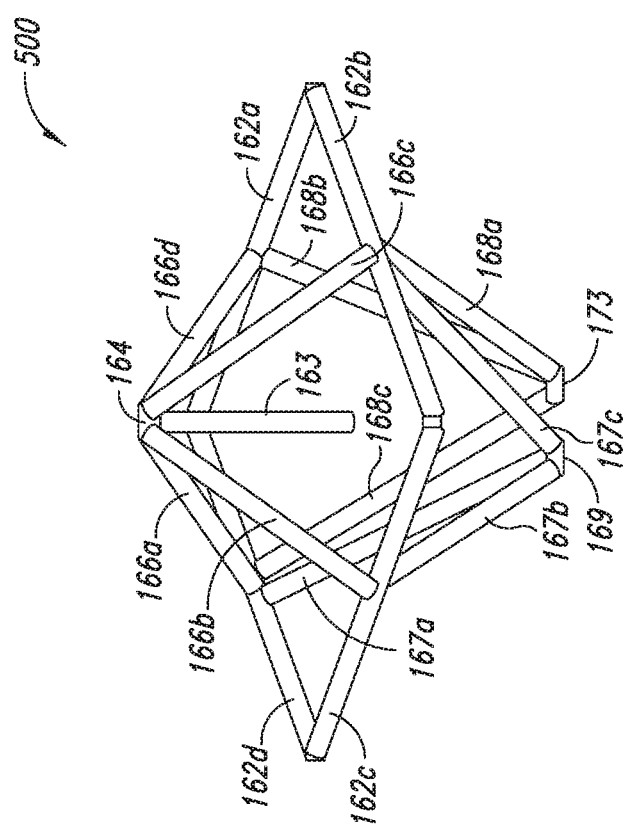

FIGS. 16A-16C are various views of an inflatable parachute airbag assembly 400. The inflatable parachute airbag assembly 400 is an alternative implementation of the inflatable parachute airbag assembly 300 illustrated in FIGS. 15A-15C. The inflatable parachute airbag assembly 400 includes a plurality of support tubes 156*a*-156*h*, a main fill tube 159, a perimeter tube 155, and a top hub 157, which are variations of the plurality of support tubes 152*a*-152*h*, the main fill tube 154, the perimeter tube 150, and the hub 153 illustrated in FIG. 9, respectively. And similar to the implementations in of the inflatable parachute airbag assembly 200 illustrated in FIG. 9, the inflatable parachute airbag assembly 400 also includes a bottom hub 158 and a plurality of fill tubes 160*a*-160*h*, which are variations of the bottom hub 147 and the plurality of fill tubes 142*a*-142*h* illustrated in FIG. 9, respectively.

All of these components have features and functionality similar to what is described above, and will not be completely reiterated here. Briefly, however, when deployed from an aerial vehicle, an inflation mechanism provides gas to the bottom hub 158. The bottom hub 158 distributes the gas to the main fill tube 159 and to the plurality of fill tubes 160*a*-160*h*. The main fill tube 154 provides the gas to the top hub 157, which distributes the gas to the support tubes 156*a*-156*h*. Similarly, the plurality of fill tubes 160*a*-160*h* provide gas to respective support tubes of the plurality of support tubes 156*a*-156*h*. The perimeter tube 160 is inflated via the plurality of support tubes 156*a*-156*h*.

It should be noted that although not illustrated in FIGS. 16A-16C, for clarity of the figures, the inflatable parachute airbag assembly 400 also includes a parachute material. The parachute material would be similar to the parachute material 129 on the top portion 127 of the inflatable parachute airbag assembly 100B in FIG. 3B. The parachute material can be positioned and connect to the outside or inside of the support tubes relative to the main fill tube such that air pushes against the parachute material when deployed. The parachute material can be any of a variety of lightweight materials that can be used to create drag. When deployed, air can then flow through a central opening of the perimeter tube 155 and into the concave-like structure created by the support tubes 156*a*-156*h*, which creates drag on the attached parachute material.

It should be noted that a left view, right view, and back view of the inflatable parachute airbag assembly 400 would substantially mimic the front view illustrated in FIG. 16C.

FIGS. 17A-17E are various views of an inflatable parachute airbag assembly 500. The inflatable parachute airbag assembly 500 is an alternative implementation of the inflatable parachute airbag assembly 100A illustrated in FIG. 3A. The inflatable parachute airbag assembly 500 includes a plurality of top support tubes 166*a*-166*d*, a main fill tube 163, a perimeter tube 162, and a hub 164, which are variations of the plurality of top support tubes 120*a*-120*h*, the main fill tube 122, the perimeter tube 121, and the top hub 117 illustrated in FIG. 3A, respectively.

The main fill tube 163 is connected to and in fluid communication between an inflation mechanism (not shown) and the hub 164. The main fill tube 163 is operative as an input tube to the hub 164 such that gas passes from the inflation mechanism to the hub 164.

Similar to that which is described above in conjunction with FIG. 3A, each of the top support tubes 166*a*-166*d* is positioned between the hub 164 and the perimeter tube 162. In this implementation, the perimeter tube 162 may be a square comprising multiple perimeter tubes 162*a*-162*d*, unlike the annulus shape of the perimeter tube 121 in FIG. 3A. As illustrated, the top support tubes 166*a*, 166*b*, 166*c*, and 166*d* connect between the hub 164 and the perimeter tube 162*d*, 162*c*, 162*b*, and 162*a*, respectively.

The plurality of top support tubes 166*a*-166*d* are connected to and in fluid communication with the hub 164. The hub 164 is operative to distribute gas from the main fill tube 163 into the plurality of top support tubes 166*a*-166*d*. The plurality of top support tubes 166*a*-166*d* are also connected to and in fluid communication with the perimeter tubes 162*a*-162*d*.

The top support tubes 166a-166d are symmetrically positioned, with one top support tube connecting to each perimeter tube 162a-162d radially around a central axis of the perimeter tube. The resulting structure of the inflatable parachute airbag assembly 500 is a concave-like structure that, when covered by a parachute material (not illustrated), can create drag when the inflatable parachute airbag assembly 500 is deployed from an aerial vehicle.

The inflatable parachute airbag assembly 500 also includes a plurality of bottom support tubes 167a-167c and 168a-168c. A first end of the bottom support tubes 167a-167c are connected to and in fluid communication with the perimeter tubes 162d, 162c, and 162b, respectively. The other end of the bottom support tubes 167a-167c are connected to one another, such as at another hub 169. Similarly, a first end of the bottom support tubes 168a-168c are connected to and are in fluid communication with the perimeter tubes 162b, 162a, and 162d, respectively. The other end of the bottom support tubes 168a-168c are connected to one another, such as at another hub 173. The bottom support tubes 167a-167c and the bottom support tubes 168a-168c inflate in such a way that the hubs 169 and 173 move in opposite directions of each other (e.g., increasing the void between them during the inflation process), enabling the inflatable parachute airbag assembly 500 to inflate and envelop the aerial vehicle in a mouth-like fashion before coming back together (e.g., decreasing the void between them once substantially inflated). Once fully inflated, the hubs 169 and 173 are positioned adjacent to one another, similar to what is described above.

Although not illustrated in FIGS. 17A-17E, for clarity of the figures, the inflatable parachute airbag assembly 500 also includes a parachute material. The parachute material would be similar to the parachute material 129 on the top portion 127 of the inflatable parachute airbag assembly 100B in FIG. 3B. The parachute material can be positioned and connect to an outside or inside of the top support tubes 166a-166d relative to the main fill tube 163 such that air pushes against the parachute material when deployed. The parachute material can be any of a variety of lightweight materials that can be used to create drag.

When deployed, the inflation mechanism provides gas to the main fill tube 163, which distributes the gas to the hub 164. By distributing the gas to the main fill tube 163 and the hub 164 first, the inflatable parachute airbag assembly 500 is pushed in a direction of the hub 164, which pushes the inflatable parachute airbag assembly 500 and the aerial vehicle away from each other—creating an initial separation between the aerial vehicle and the hub 164. The main fill tube 164 then inflates the top support tubes 166a-166d, via the hub 164, and the perimeter tubes 162a-162d via the respectively connected top support tubes 166a-166d. The initial separation of the aerial vehicle and the hub 164 allows for the top support tubes 166a-166d, the bottom support tubes 167a-167c and 168a-168c, and the perimeter tubes 162a-162d to fully inflate such that the inflatable parachute airbag assembly 500 deploys around and encases the aerial vehicle without interference by the aerial vehicle. Air can then flow between the bottom support tubes 167a-167c and 168a-168c and into the concave-like structure created by the top support tubes 166a-166d, which creates drag on the parachute material.

Similarly, the inflatable parachute airbag assembly 500 may also include support straps (not illustrated) similar to those described above. These support straps provide stability and support for connecting the inflatable parachute airbag assembly 500 to an aerial vehicle.

Additionally, a back view of the inflatable parachute airbag assembly 500 would substantially mirror the front view illustrated in FIG. 17D, and a left view of the inflatable parachute airbag assembly 500 would substantially mirror the right view illustrated in FIG. 17E.

Figure 18A:
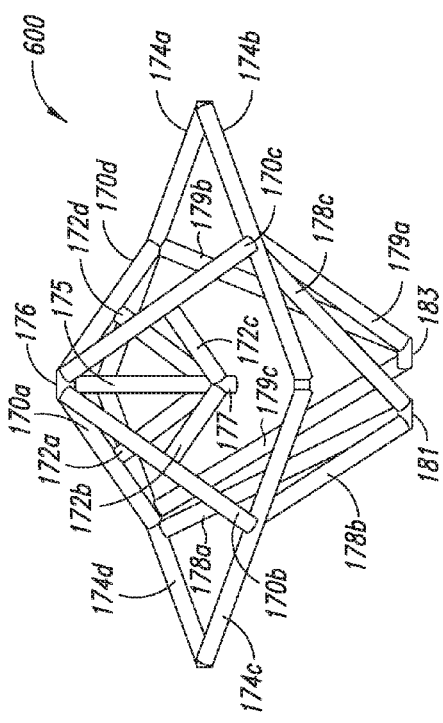
FIGS. 18A-18C are various views of an alternative inflatable parachute airbag assembly in accordance with the present disclosure.
Figure 18C:
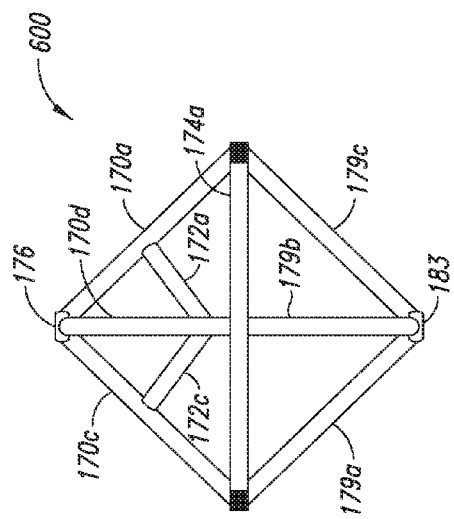
Figure 18B:
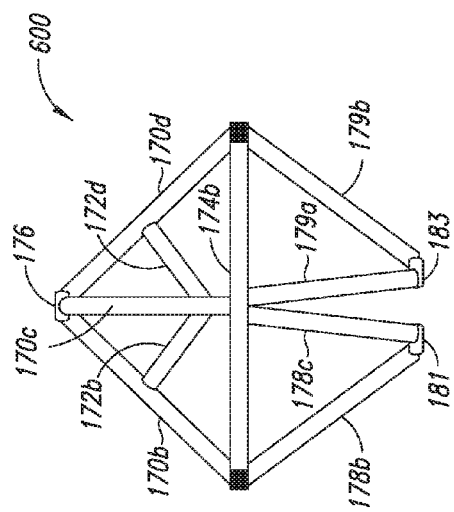

FIGS. 18A-18C are various views of an inflatable parachute airbag assembly 600. The inflatable parachute airbag assembly 600 is an alternative implementation of the inflatable parachute airbag assembly 500 illustrated in FIGS. 17A-17C. The inflatable parachute airbag assembly 600 includes a plurality of top support tubes 170a-170d, a main fill tube 175, a perimeter tube 174, a top hub 176, and a plurality of bottom support tubes 178a-178c and 179a-179c, which are variations of the plurality of top support tubes 166a-166d, a main fill tube 163, the perimeter tube 162, the hub 167, and the plurality of bottom support tubes 167a-167c and 168a-168c illustrated in FIG. 17A, respectively. And similar to the implementations of the inflatable parachute airbag assembly 100A illustrated in FIG. 3A, the inflatable parachute airbag assembly 600 also includes a bottom hub 177 and a plurality of fill tubes 172a-172d, which are variations of the bottom hub 119 and the plurality of fill tubes 124a-124h illustrated in FIG. 3A, respectively.

All of these components have features and functionality similar to what is described above, and will not be completely reiterated here. Briefly, however, when deployed from an aerial vehicle, an inflation mechanism provides gas to the bottom hub 177. The bottom hub 177 distributes the gas to the main fill tube 175 and to the plurality of fill tubes 172a-172d. The main fill tube 175 provides the gas to the top hub 176, which distributes the gas to the top support tubes 170a-170d. Similarly, the plurality of fill tubes 172a-172d provide gas to respective support tubes of the plurality of top support tubes 170a-170d. Each of the perimeter tubes 174a-174d is inflated via the respectively connected support tube of the plurality of top support tubes 170a-170d.

It should be noted that although not illustrated in FIGS. 18A-18C, for clarity of the figures, the inflatable parachute airbag assembly 600 also includes a parachute material. The parachute material would be similar to the parachute material 129 on the top portion 127 of the inflatable parachute airbag assembly 100B in FIG. 3B. The parachute material can be positioned and connect to an outside or inside of the top support tubes 170a-170d relative to the main fill tube 175 such that air pushes against the parachute material when deployed. The parachute material can be any of a variety of lightweight materials that can be used to create drag.

Similarly, the inflatable parachute airbag assembly 600 may also include support straps (not illustrated) similar to those described above. These support straps provide stability and support for connecting the inflatable parachute airbag assembly 600 to an aerial vehicle.

It should be noted that a top and bottom views of the inflatable parachute airbag assembly 600 would substantially resemble the top and bottom views of the inflatable parachute airbag assembly 500 shown in FIGS. 17B and 17C, respectively. Additionally, a back view of the inflatable parachute airbag assembly 600 would substantially mirror the front view illustrated in FIG. 18B, and a left view of the inflatable parachute airbag assembly 600 would substantially mirror the right view illustrated in FIG. 18C.

Figure 19A:
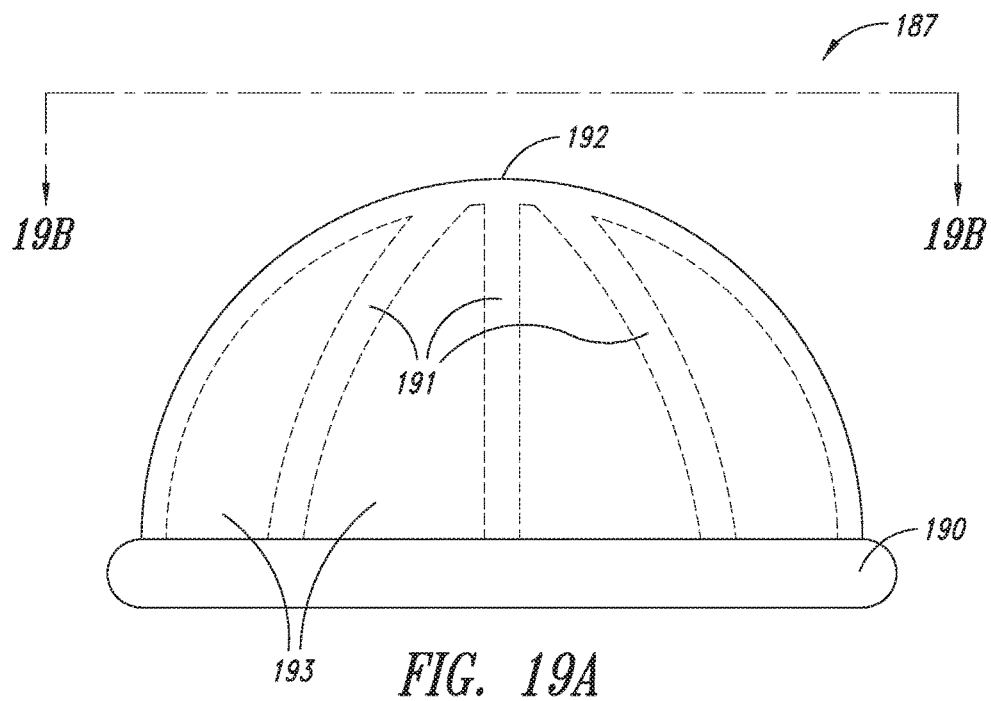
FIGS. 19A-19B are various views of an alternative inflatable parachute airbag assembly in accordance with the present disclosure.
Figure 19B:
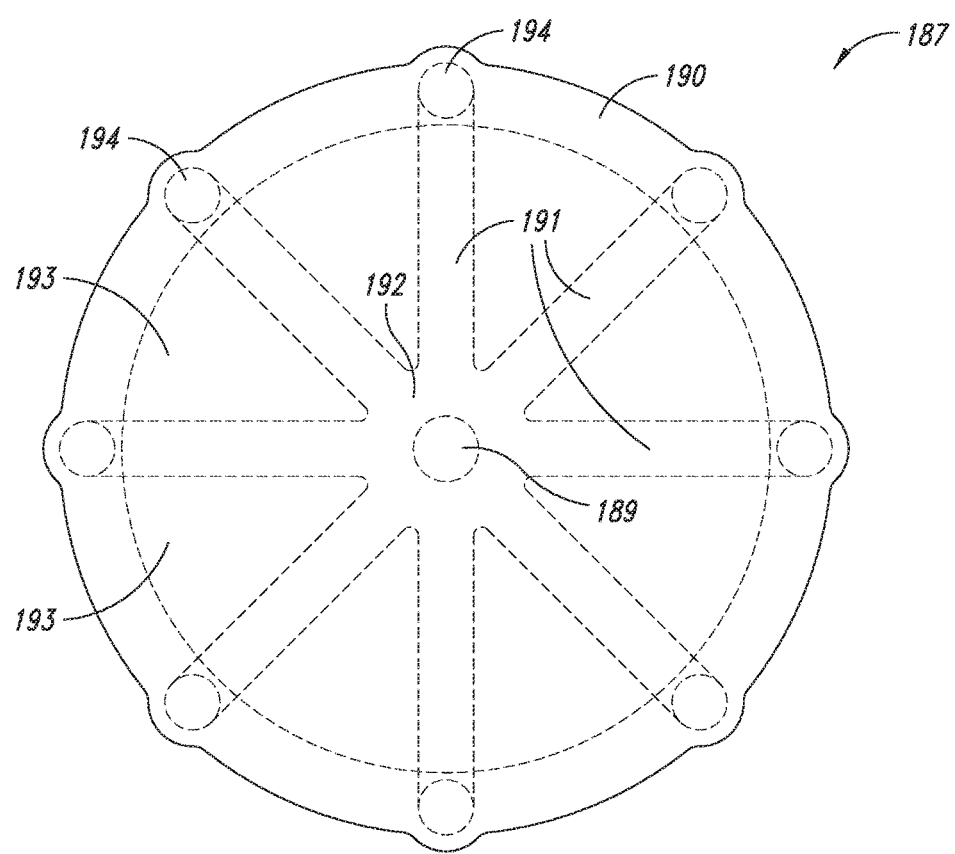

FIGS. 19A-19B are various views of an inflatable parachute airbag assembly 187. FIG. 19A is a side view of the inflatable parachute airbag assembly 187, and FIG. 19B is a top view of the inflatable parachute airbag assembly 187 (although a bottom view would be substantially similar to FIG. 19B). The inflatable parachute airbag assembly 187 includes parachute material 193 connected at its periphery to a perimeter tube 190 (similar to perimeter tube 139 in FIG. 9). The parachute material 193 is in a dome or semispheric shape to create a concave-like structure, similar to what is described elsewhere herein. The parachute material 193 includes two layers of air-tight material that are attached to one another to create and embed a plurality of cavities 191 between the layers of material. The cavities 191 are tube-like structures operable of being inflated and pressurized—similar to the support tubes 140a-140h in FIG. 9—when the inflatable parachute airbag assembly 187 is deployed from an aerial vehicle. Each of the cavities 191 are in fluid communication with each other at a hub 192 (which is also created by a cavity between different layers of the parachute material 193), expand radially from the hub 192, and are in fluid communication with the perimeter tube 190 at junctions 194. In some implementations, the hub 192, cavities 191, and the perimeter tube 190 are inflated via a main fill tube 189 similar to main fill tube 146 in FIG. 9.

Figure 20A:
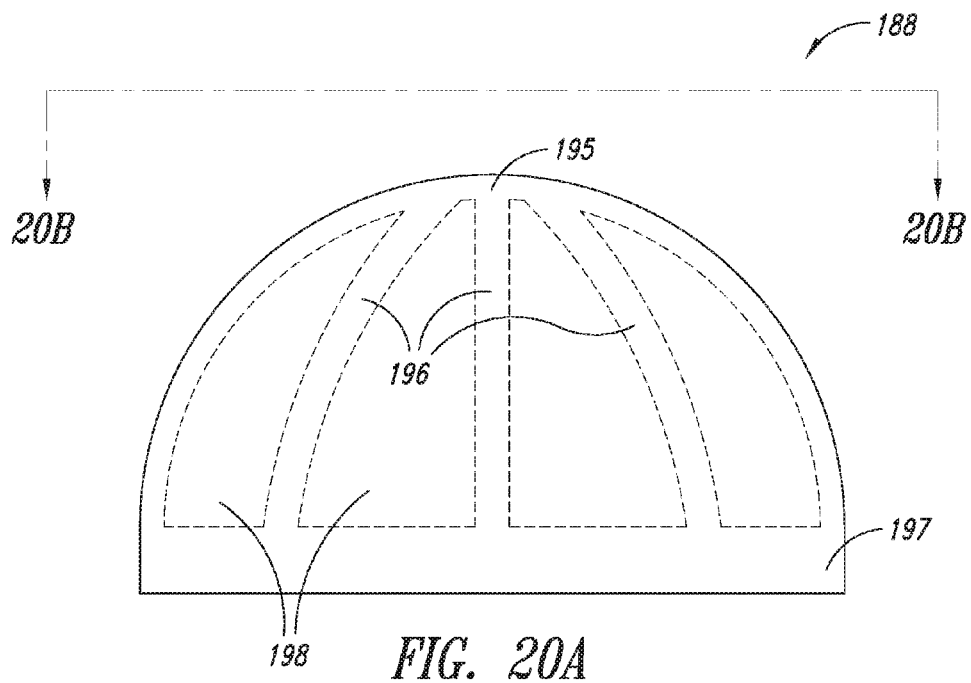
FIGS. 20A-20B are various views of an alternative inflatable parachute airbag assembly in accordance with the present disclosure.
Figure 20B:
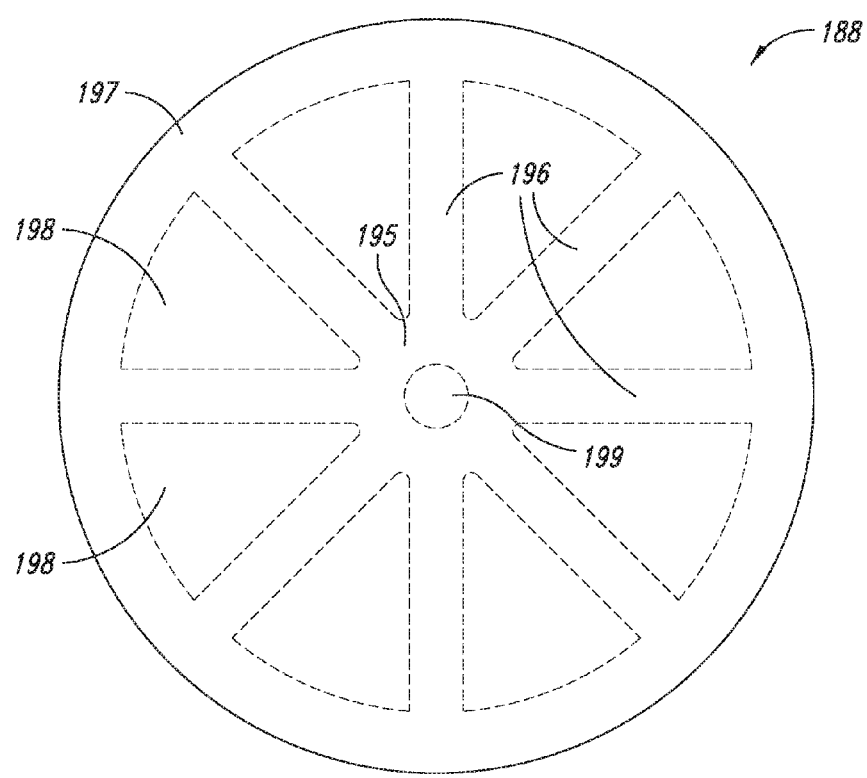

FIGS. 20A-20B are various views of an inflatable parachute airbag assembly 188. FIG. 20A is a side view of the inflatable parachute airbag assembly 188, and FIG. 20B is a top view of the inflatable parachute airbag assembly 188 (although a bottom view would be substantially similar to FIG. 20B). The inflatable parachute airbag assembly 188 is similar to what is described above with the inflatable parachute airbag assembly 187 in FIGS. 19A-19B, but with a perimeter tube 197 embedded into parachute material 198 similar to cavities 196. The parachute material 198 is in a dome or semispheric shape to create a concave-like structure, similar to what is described elsewhere herein. The parachute material 198 includes two layers of air-tight material that are attached to one another to create and embed a plurality of cavities 196 and the perimeter tube 197 between the layers of material. The cavities 196 are tube-like structures operable of being inflated and pressurized—similar to the cavities 191 in FIGS. 19A-19B—when the inflatable parachute airbag assembly 188 is deployed from an aerial vehicle. Each of the cavities 196 are in fluid communication with each other at a hub 195 (which is also created by a cavity between different layers of the parachute material 198), expand radially from the hub 195, and are in fluid communication with the perimeter tube 197. In some implementations, the hub 195, cavities 196, and the perimeter tube 197 are inflated via a main fill tube 199, similar to main fill tube 189 in FIG. 19B.

Figure 21A:
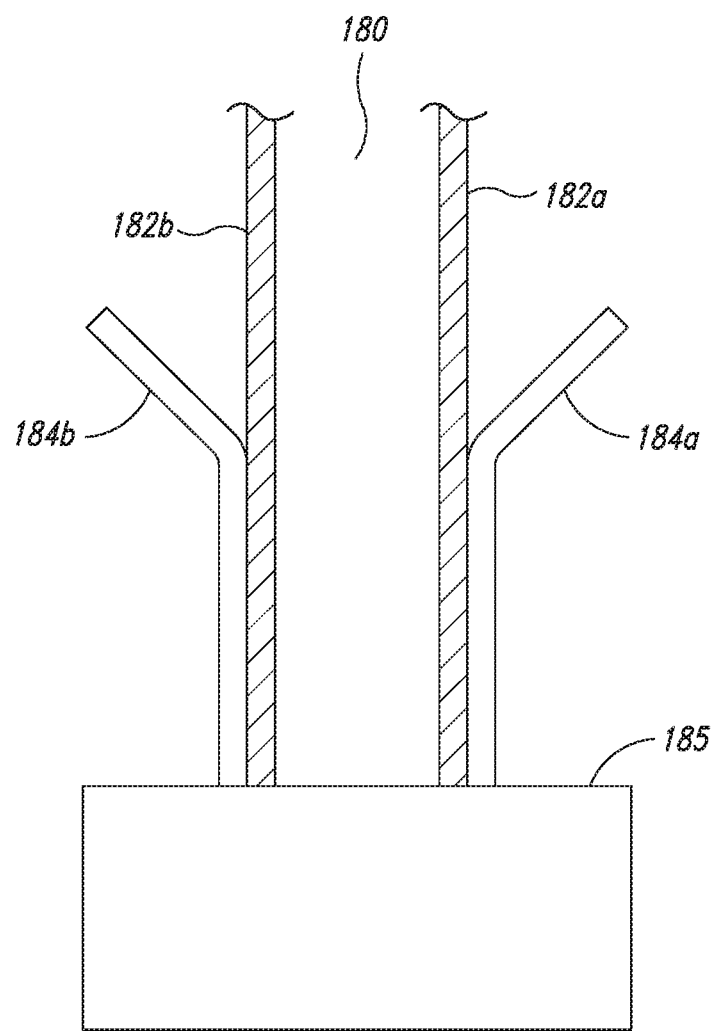
FIGS. 21A-21B illustrate an inflation tube and support strap deployment in accordance with the present disclosure.
Figure 21B:
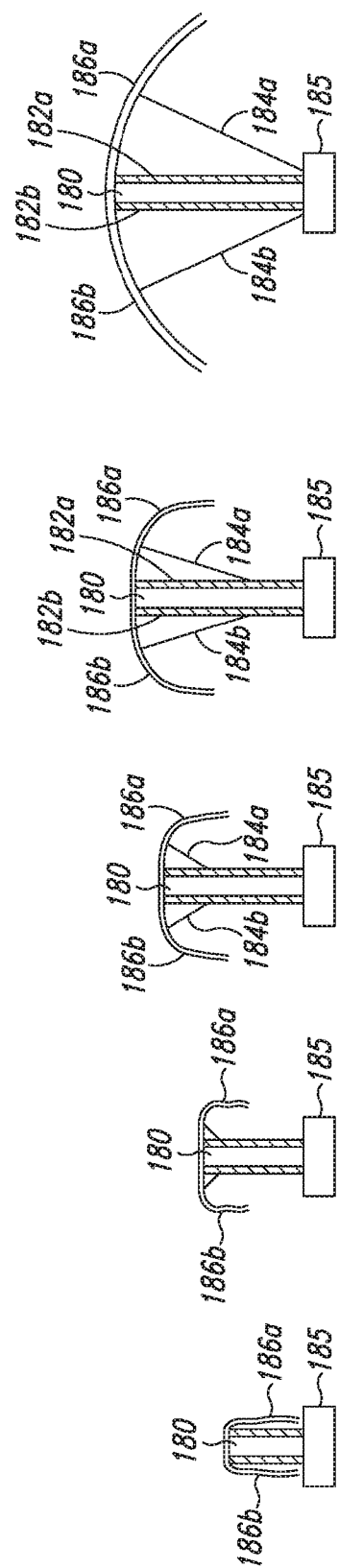

FIGS. 21A and 21B illustrate the deployment of an inflatable parachute airbag assembly. For ease of illustration, only a main fill tube 180, two support straps 184a-184b, and parachute material 186 are shown—support tubes, perimeter tubes, and other components of the inflatable parachute airbag assembly and system are not shown. It should be noted that this deployment of the support straps could be utilized with any of the various implementations of the inflatable parachute airbag systems described herein. Also, additional support straps than what is illustrated may be employed.

The main fill tube 180, the support straps 184a-184b, and the parachute material 186 may be variations of the main fill tube 122, the support straps 132a-132b, and the parachute material 129 in FIGS. 8A-8B, respectively. The support straps 184a-184b are connected between a housing 185 (which may be a variation of the housing 131 in FIG. 8A) and the parachute material 186.

The main fill tube 180 includes a connection mechanism 182 for removably coupling the support straps 132a-132b to the main fill tube. In some implementations, the connection mechanism 182 is a hook and loop connection, where the hook-connection (or loop-connection) portion is connected to the main fill tube 180 and the loop-connection (or hook-connection) portion is connected to the support straps 132a-132b. However, other connection mechanism 182 may also be utilized, such as adhesives, static electricity, etc.

As described herein, gas from an inflation mechanism (not illustrated) inflates the main fill tube 180 and multiple support tubes (not illustrated). As the main fill tube 180 and the support tubes inflate the inflatable parachute airbag expands and the parachute material 186 spreads out from the main fill tube 180. This spreading of the parachute material 186 causes stress on the connection mechanism 182 between the main fill tube 180 and the support straps 184a-184b. The stress on the connection mechanism 182 increases as the parachute material 186 continues to spread out from the main fill tube 180, which results in a peeling separation of the support straps 184 from the main fill tube 180. The more the parachute material 186 is spread out due to the inflation of the inflatable parachute airbag assembly, the more the support straps 184 separate from the main fill tube 180. Accordingly, as the parachute material 186a spreads away from the main fill tube 180, the support strap 184a is peeled away from the connection mechanism 182a. Simultaneously, as the parachute material 186b spreads away from the main fill tube 180, the support strap 184b is peeled away from the connection mechanism 182b.

Once the inflatable parachute airbag assembly is fully inflated, the support straps 184 are no longer attached to the main fill tube 180 but are expanded and support the force of drag on the parachute material and the inflatable parachute airbag assembly.

It should be noted that a similar connection mechanism can be used if the support straps are coupled to the aerial vehicle or to the support tubes of the inflatable parachute airbag assembly. In such an implementation, as the support tubes inflate, the support straps would peel away and detach from the main tube in a manner similar to what is described above.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An apparatus for use with an aerial vehicle, the apparatus comprising:
   an inflation device;
   an inflatable frame capable of being stored on the aerial vehicle in a collapsed configuration, deployed from the aerial vehicle into an inflated configuration, and inflated around the aerial vehicle while the inflatable frame is being deployed to at least partially encase the aerial vehicle within the inflatable frame when the inflatable frame is in the inflated configuration, the inflatable frame including:
   a first conduit having a length;
   a second conduit in fluid communication with the inflation device; and
   a plurality of support conduits positioned radially along the length of the first conduit, each support conduit of the plurality of support conduits having a first end attached to and in fluid communication with the first conduit and a second end in fluid communication with the second conduit; and drag inducing material connected to the inflatable frame to create drag to reduce airspeed of the aerial vehicle.

2. The apparatus of claim 1, wherein the second conduit constitutes a main fill tube having a first end and a second end, the first end of the main fill tube is in fluid communication with the inflation device and the second end of the main fill tube is in fluid communication with the second end of each support conduit such that air flows from the inflation device through the main fill tube through the plurality of support conduits and into the first conduit.

3. The apparatus of claim 1, wherein at least a subset of the plurality of support conduits are arcuate and cause the inflatable frame and the drag inducing material to be in a concave-like formation when the inflatable frame is in the inflated configuration.

4. The apparatus of claim 1, wherein the inflation device is capable of storing a gas and providing the stored gas to the inflatable frame to cause the inflatable frame to deploy from the aerial vehicle and into the inflated configuration.

5. The apparatus of claim 1, the inflatable frame further comprising:

a plurality of fill tubes extending from the second conduit, each fill tube of the plurality of fill tubes having a first end and a second end, the first end of each fill tube of the plurality of fill tubes is connected to and in fluid communication with the second conduit and the second end of each respective fill tube of the plurality of fill tubes is connected to a respective support conduit of the plurality of support conduits such that gas flows from the second conduit to the plurality of fill tubes.

6. The apparatus of claim 1, further comprising:

a plurality of weight distribution straps, each weight distribution strap having a first end and a second end, the first end of each weight distribution strap is capable of being physically connected to the aerial vehicle and the second end of each weight distribution strap is capable of being physically connected to the drag inducing material.

7. The apparatus of claim 1, further comprising:

a plurality of weight distribution straps, each weight distribution strap having a first end and a second end, the first end of each weight distribution strap is structured to be physically connected to the aerial vehicle and the second end of each weight distribution strap is structured to be physically connected to the inflatable frame.

8. The apparatus of claim 1, wherein the inflatable frame further includes:

a plurality of bottom support tubes connected to and in fluid communication with the first conduit, the plurality of bottom support tubes extending radially from the first conduit in a direction that substantially mirrors a direction that the plurality of support tubes extend from the first conduit so that the inflatable frame fully encases the aerial vehicle within the inflatable frame when the inflatable frame is in the inflated configuration.

9. The apparatus of claim 8, further comprising:

mesh material connected to the plurality of bottom support tubes and structured to be permeable, allowing air to flow through the mesh material to promote drag on the drag inducing material when the inflatable frame is in the inflated configuration.

10. An inflatable system for use with an aerial vehicle, the inflatable system comprising:

an inflatable frame to be stored on and deployed from the aerial vehicle and to inflate around the aerial vehicle to partially encase the aerial vehicle when inflated, the inflatable frame having a perimeter tube, a main fill tube, and a plurality of first support tubes, a first end of each of the plurality of first support tubes connects to and is in fluid communication with the main fill tube and a second end of each of the plurality of first support tubes connects to and is in fluid communication with the perimeter tube;

a drag inducing material to create drag to reduce a velocity of the aerial vehicle in response to inflation of the inflatable frame; and an inflation device in fluid communication with the main fill tube to inflate the inflatable frame.

11. The inflatable system of claim 10, wherein the main fill tube has a first end and a second end, the first end of the main fill tube is in fluid communication with the inflation device and the second end of the main fill tube is in fluid communication with the second end of each support tube of the plurality of first support tubes to direct a flow of gas from the inflation device through the main fill tube, through the plurality of first support tubes, and into the perimeter tube.

12. The inflatable system of claim 10, the inflatable frame further comprising:

a plurality of fill tubes extending from the main fill tube, each fill tube of the plurality of fill tubes having a first end and a second end, the first end of each fill tube of the plurality of fill tubes is in fluid communication with the main fill tube and the second end of each respective fill tube of the plurality of fill tubes is connected to a respective support tube of the plurality of first support tubes to direct a flow of gas from the main fill tube into the plurality of fill tubes.

13. The inflatable system of claim 10, further comprising:

a plurality of weight distribution straps, each weight distribution strap having a first end and a second end, the first end of each weight distribution strap is structured to be physically connected to the aerial vehicle and the second end of each weight distribution strap is structured to be physically connected to the drag inducing material or the inflatable frame.

14. The inflatable system of claim 10, wherein the inflatable frame further includes:

a plurality of second support tubes connected to and in fluid communication with the perimeter tube, the plurality of second support tubes extending from the perimeter tube in a direction that substantially mirrors a direction that the plurality of first support tubes extend from the perimeter tube to cause the inflatable frame to fully encase the aerial vehicle within the inflatable frame.

15. The inflatable system of claim 14, further comprising:

mesh material connected to the plurality of second support tubes, the mesh material capable of allowing air to flow through the mesh material to promote drag on the drag inducing material when the inflatable frame is inflated.

16. An aerial vehicle, comprising:

a body;

at least one motor mounted on the body and coupled to at least one lift generating device;

a descent detection system operable to detect a descent condition of the aerial vehicle and to output a descent condition signal in response to detection of the descent condition; and a descent restraint system on the body, including: a an inflatable frame affixed to the body, the inflatable frame including a first plurality of support tubes deployable in a concave-like formation to at least partially encase the aerial vehicle within the inflatable frame upon inflation of the inflatable frame;

drag inducing material connected to the inflatable frame to reduce a descent velocity of the aerial vehicle; and an inflation device coupled to the descent detection system and operable to generate a flow of gas to inflate the inflatable frame in response to the descent condition signal.

17. The aerial vehicle of claim 16, wherein the inflatable frame includes a main fill tube having a first end and a second end, the first end of the main fill tube is in fluid communication with the inflation device and the second end of the main fill tube is in fluid communication with the second end of each support tube of the first plurality of support tubes to direct a flow of gas from the inflation device through the main fill tube and into the first plurality of support tubes.

18. The aerial vehicle of claim 17, wherein the inflatable frame further includes:

a plurality of fill tubes extending from the main fill tube, each fill tube of the plurality of fill tubes having a first end and a second end, the first end of each fill tube of the plurality of fill tubes is in fluid communication with the main fill tube and the second end of each respective fill tube of the plurality of fill tubes is connected to a respective support tube of the first plurality of support tubes.

19. The aerial vehicle of claim 16, wherein the descent restraint system further includes:

a plurality of weight distribution straps, each weight distribution strap having a first end and a second end, the first end of each weight distribution strap is structured to be physically connected to the body and the second end of each weight distribution strap is structured to be physically connected to the drag inducing material or the inflatable frame.

20. The aerial vehicle of claim 16, wherein the inflatable frame further includes:

a second plurality of support tubes in fluid communication with the first plurality of support tubes, the second plurality of support tubes mirror the first plurality of support tubes so that the inflatable frame fully encases the aerial vehicle within the inflatable frame when the inflatable frame is inflated.

* * * * *

UNITED STATES PATENT AND TRADEMARK OFFICE
CERTIFICATE OF CORRECTION

PATENT NO. : 9,908,629 B2  
APPLICATION NO. : 15/436604  
DATED : March 6, 2018  
INVENTOR(S) : Alan Jamal Erickson Page 1 of 1

It is certified that error appears in the above-identified patent and that said Letters Patent is hereby corrected as shown below:

In the Claims

Column 22, Claim 16, Line 67:
"including: a" should read, --including:--.

Signed and Sealed this
Twenty-fifth Day of June, 2019

Andrei Iancu
*Director of the United States Patent and Trademark Office*